United States Patent
Long et al.

(10) Patent No.: US 11,089,051 B1
(45) Date of Patent: Aug. 10, 2021

(54) PREVENTING DENIAL-OF-SERVICE ATTACKS IN DECENTRALIZED EDGE NETWORKS USING VERIFIABLE DELAY FUNCTIONS (VDFS)

(71) Applicant: Theta Labs, Inc., San Jose, CA (US)

(72) Inventors: Jieyi Long, Santa Clara, CA (US); Mitchell C. Liu, Los Altos, CA (US)

(73) Assignee: Theta Labs, Inc., San Jose, CA (US)

( * ) Notice: Subject to any disclaimer, the term of this patent is extended or adjusted under 35 U.S.C. 154(b) by 0 days.

(21) Appl. No.: 17/224,109

(22) Filed: Apr. 6, 2021

Related U.S. Application Data

(60) Provisional application No. 63/149,362, filed on Feb. 15, 2021.

(51) Int. Cl.
*H04L 29/06* (2006.01)
*H04L 29/08* (2006.01)

(52) U.S. Cl.
CPC ...... *H04L 63/1458* (2013.01); *H04L 63/1416* (2013.01); *H04L 63/1425* (2013.01); *H04L 67/1002* (2013.01); *H04L 67/2842* (2013.01)

(58) Field of Classification Search
CPC ....... H04L 63/1458; H04L 9/00; H04L 9/005; G06F 21/554; G06F 16/252; G06F 21/6209
USPC .......................................................... 726/22
See application file for complete search history.

(56) References Cited

U.S. PATENT DOCUMENTS

| | | | | |
|---|---|---|---|---|
| 10,104,097 | B1* | 10/2018 | Yumer | G06F 21/554 |
| 10,887,104 | B1* | 1/2021 | Jayachandran | H04L 9/3239 |
| 2012/0198514 | A1* | 8/2012 | McCune | G06F 21/57 726/1 |
| 2013/0147900 | A1* | 6/2013 | Weiser | H04N 7/15 348/14.08 |

(Continued)

FOREIGN PATENT DOCUMENTS

CN        111985003 A     11/2020

OTHER PUBLICATIONS

Attias et al., "Preventing Denial of Service Attacks in IoT Networks through Verifiable Delay Functions", 2020 (Year: 2020).*

(Continued)

*Primary Examiner* — Ondrej C Vostal
(74) *Attorney, Agent, or Firm* — American Patent Agency PC; Daniar Hussain; Xiaomeng Shi

(57) ABSTRACT

Methods and systems are described for reducing malicious attacks on a first device in a computer network comprising a plurality of devices. The method may include, receiving by the first device, a request for a service from a second device. Next, determining that the second device is suspicious based on the request. Next, generating a verifiable delay function (VDF) based on the determination and transmitting the VDF to the second device. Then, receiving a solution associated with the VDF after a predetermined time duration, and verifying that the solution is correct. Finally, generating, based on the verification, a response to the request for the service from the second device. The network can include a client-server network, a decentralized network, or a decentralized data streaming network; the first device can include a server device, a first peer node, or a cacher peer node; and the second device can include a client device, a second peer node, or a viewer peer node.

20 Claims, 12 Drawing Sheets

(56) References Cited

U.S. PATENT DOCUMENTS

| | | | | |
|---|---|---|---|---|
| 2013/0346626 | A1* | 12/2013 | Zhang | H04L 65/1069 709/231 |
| 2015/0032890 | A1* | 1/2015 | Bott | G06F 21/552 709/224 |
| 2015/0096020 | A1* | 4/2015 | Adams | H04L 63/10 726/23 |
| 2017/0195345 | A1* | 7/2017 | Maresca | H04L 63/1416 |
| 2018/0276404 | A1* | 9/2018 | Dotan-Cohen | G06F 9/542 |
| 2019/0386817 | A1* | 12/2019 | Carson | G06F 21/64 |
| 2020/0153627 | A1* | 5/2020 | Wentz | G06F 21/6209 |
| 2020/0162264 | A1 | 5/2020 | Zamani et al. | |
| 2020/0167512 | A1* | 5/2020 | Chitra | G06Q 30/0185 |
| 2020/0201910 | A1* | 6/2020 | Gavaudan | G06Q 20/3823 |
| 2020/0389312 | A1* | 12/2020 | Boneh | H04L 9/3218 |
| 2021/0018953 | A1* | 1/2021 | Ford | G06F 1/14 |
| 2021/0019435 | A1* | 1/2021 | Sanso | G06F 16/252 |

OTHER PUBLICATIONS

Boneh et al., "Verifiable Delay Functions", 2019 (Year: 2019).*
Christodorescu et al., "Malware Detection", 2007 (Year: 2007).*
Golden, "Verifiable Delay Functions", 2021 (Year: 2021).*
Ethereum, "Verifiable delay functions and attacks", 2018 (Year: 2018).*
Najafi, "Front-Running Attacks on Blockchain", 2020 (Year: 2020).*
Shakil et al., "A Novel Dynamic Framework to detect DDoS in SDN using Meta Heuristic Clustering", 2019 (Year: 2019).*
Dembo et al., "Everything is a Race and Nakamoto Always Wins", 2020 (Year: 2020).*
Doweck et al., "Multi-Party Timed Commitments", 2020 (Year: 2020).*
Lee et al., "Practical and Verifiable Electronic Sortition", 2020 (Year: 2020).*
Long et al., "Nakamoto Consensus with Verifiable Delay Puzzle", 2019 (Year: 2019).*
Microsoft Computer Dictionary, "data stream", "streaming", 2002 (Year: 2002).*
Wang et al., "SoK: Sharding on Blockchain", 2019 (Year: 2019).*
Attias et al., "Preventing Denial of Service Attacks in IoT Networks through Verifiable Delay Functions", IEEE Global Communications Conference, Jan. 25, 2021, pp. 1-6.
Boneh et al., "A Survey of Two Verifiable Delay Functions", Aug. 22, 2018, pp. 1-13.
Boneh et al., "Verifiable Delay Functions", Jun. 26, 2019, pp. 1-32.
Christian Reitwieber, "zkSNARKs in a Nutshell", Ethereum foundation blog, Dec. 5, 2016, pp. 1-15.

* cited by examiner

The Edge Node Network

300

Stream Advertisement and Discovery

Using VDFs to Defend Against Attack in Client-Server Networks

Using VDFs to Defend Against Attack in Edge Node Networks

PREVENTING DENIAL-OF-SERVICE ATTACKS IN DECENTRALIZED EDGE NETWORKS USING VERIFIABLE DELAY FUNCTIONS (VDFS)

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application is related to co-pending U.S. patent application Ser. No. 17/218,245, filed on 31 Mar. 2021, entitled "Non-Fungible Token (NFT) Based Digital Rights Management in a Decentralized Data Delivery Network", which itself is a non-provisional of and claims the benefit of priority to provisional application U.S. Ser. No. 63/120,218, filed on 2 Dec. 2020, entitled "Decentralized Data Streaming and Delivery Network with Digital Rights Management and Associated Systems and Methods," the entire disclosures of all of which are hereby incorporated by reference in their entireties herein.

This application is also related to U.S. Pat. No. 10,771,524, issued on 8 Sep. 2020 (U.S. Ser. No. 16/751,772, filed on 24 Jan. 2020), entitled "Methods and Systems for a Decentralized Data Streaming and Delivery Network," which itself is a non-provisional of and claims the benefit of priority to provisional application U.S. Ser. No. 62/880,682, filed on 31 Jul. 2019, entitled "Methods and Systems for Micropayment Support to Blockchain-Incentivized, Decentralized Video Streaming and Delivery," and is also a non-provisional of and claims the benefit of priority to provisional application U.S. Ser. No. 62/914,176, filed on 11 Oct. 2019, entitled "Methods and Systems for a Decentralized Data Streaming and Delivery Network," the entire disclosures of all of which are hereby incorporated by reference in their entireties herein.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the present invention are in the field of decentralized data delivery, and pertain particularly to secure and efficient data streaming and delivery in a decentralized network using verifiable delay functions (VDFs) to prevent malicious attacks.

BACKGROUND OF THE INVENTION

The statements in this section may serve as a background to help understand the invention and its application and uses, but do not constitute prior art.

Internet video accounts for over three-quarters of all Internet traffic today, and may increase further to 82% by 2022, according to CISCO'S February 2019 Visual Networking Index (CISCO VNI Global IP Traffic Forecast for 2017-2022). The same report predicts that from 2017 to 2022, global Internet video traffic will grow four-fold, live Internet video will grow 15-fold, Virtual Reality and Augmented Reality traffic will grow 12-fold, and Internet gaming traffic will grow 9-fold. In the U.S., millennials between the ages of 18 and 34 are driving the growth of video streaming through the use of services like YOUTUBE, NETFLIX, HULU, and HBO. Streaming video among this group has jumped 256% from an average of 1.6 hours per week to 5.7 hours per week according to a SSRS Media and Technology survey, and mobile devices are leading the charge in video consumption.

Content Delivery Networks (CDNs), which are systems of distributed servers that minimize delay in delivering data to users by reducing the geographical distance between servers and users, are predicted by CISCO to carry 72% of Internet traffic by 2022, and they play an important role in distributing web content and streaming video data, by providing a backbone infrastructure to deliver data streams to end users. Decentralized data delivery networks, such as Peer-to-Peer (P2P) networks, offer an alternative to CDNs where peer nodes distribute content. Hybrid networks that combine both CDNs and P2P networks may offer the advantages of both types of networks for data distribution.

However, the design of both secure and efficient protocols for such networks that can serve to distribute large amounts of data is challenging. For example, all such networks are vulnerable to malicious denial-of-service (DoS) attacks. A DoS attack refers to a technique to disrupt legitimate users' access to the network. For example, the malicious DoS attack may be performed by overloading one or more nodes of the network with a large amount of data requests, leading to network congestion and inability to service the honest nodes.

Therefore, it would be an advancement in the state of the art to provide a method to prevent or minimize malicious attacks on computer networks.

It is against this background that various embodiments of the present invention were developed.

BRIEF SUMMARY OF THE INVENTION

Methods and systems are provided for reducing malicious attacks on computer networks using verifiable delay functions (VDFs). The method may be used in client-server networks, fully decentralized peer-to-peer networks, as well as in hybrid networks.

In summary, if a server detects that a client is issuing requests at, for example, a higher-than-normal frequency, the server can issue a VDF puzzle with a random seed (sometimes called a "challenge") to the client. The next request from the client then needs to contain the correct solution to the VDF puzzle before the server serves the next client request. The advantage of using VDF over Proof-of-Work (PoW) is that the VDF computation is not parallelizable. The VDF-based rate-limiting can be used in a client-server context, as well as in decentralized peer-to-peer networks. For example, if some malicious peer nodes in the network launch a Distributed Denial-of-Service (DDoS) attack on the honest nodes, the honest nodes can use the VDF-based rate-limiting mechanism to fend off the adversary.

Accordingly, in one aspect, an embodiment of the present invention is a computer-implemented method for reducing malicious attacks on a network, the network comprising a plurality of devices. The method may include, receiving, by a first device, a request for a service from a second device. Next, determining, by the first device, that the second device is suspicious based on the request. Next, generating, by the first device, a verifiable delay function (VDF) based on the determination and transmitting the VDF to the second device. Then, receiving, by the first device, a solution associated with the VDF after a predetermined time duration, and verifying that the solution is correct. Finally, generating, by the first device and based on the verification, a response to the request for the service from the second device.

In some aspects, the network may include one or more client-server connections, the first device being a server device, and the second device being a client device.

In other aspects, the network may include a decentralized network, with the plurality of devices being a plurality of nodes, the first device being a first peer node, and the second device being a second peer node.

Further, the network may include a decentralized data streaming network, the request for the service includes a stream request for a data stream, with the plurality of devices being a plurality of nodes, the first device being a cacher peer node, and the second device being a viewer peer node. In one embodiment, the method further includes, generating, by the cacher peer node, an encrypted data stream based on the data stream and a data key to decrypt the data stream; and transmitting, by the cacher peer node, the encrypted data stream and the data key to decrypt the data stream to the viewer peer node.

In one embodiment, the verifiable delay function (VDF) is selected from the group consisting of iterative squaring in RSA groups, addition of points in elliptic curves, modular exponentiations, and iteratively computing τ squarings in a Rivest-Shamir-Adleman (RSA) group.

In another embodiment, the request for the service may include a malicious request associated with a denial-of-service (DoS) attack or a spamming attack.

In another embodiment, the predetermined time duration may include a duration to solve the function, and the duration to solve the function is not reduced below a predetermined threshold by parallelizing operations to solve the function.

In another embodiment, the computer-implemented method further includes, determining, by the first device, a parameter associated with the second device; and determining, by the first device and based on the parameter, a type of the function. In some embodiments, the parameter comprises a difficulty of solving the function. In other embodiments, the determination of the parameter is based on a computational capability of the second device.

In one embodiment, the generation of the function is based on receiving, by the first device from the second device, a number of requests for receiving the service, the number of requests exceeding a predetermined threshold in a second predetermined time duration. In another embodiment, the first device tags the second device as a malicious node based on the number of requests exceeding the predetermined threshold in the second predetermined time duration.

In another aspect, one embodiment of the present invention is a non-transitory storage medium storing executable program code, the program code for reducing malicious attacks on a network. The network includes a plurality of devices. The program code is configured to receive, by a first device, a request for a service from a second device; determine, by the first device, that the second device is suspicious based on the request; generate, by the first device, a verifiable delay function (VDF) based on the determination and transmit the VDF to the second device; receive, by the first device, a solution associated with the VDF after a predetermined time duration and verify that the solution is correct; and, generate, by the first device and based on the verification, a response to the request for the service from the second device.

Other embodiments include non-transitory storage media, which store program code executable by a hardware processor, for implementing the methods and processes described herein. Yet other embodiments include systems comprising a hardware processor and a non-transitory storage medium. The non-transitory storage medium store program code that are executable by a hardware processor for implementing the methods and processes described herein. Yet other embodiments include a device comprising a hardware processor and a non-transitory storage medium. The non-transitory storage medium store program code that are executable by a hardware processor for implementing the methods and processes described herein.

Yet other aspects of the present invention include methods, processes, apparatuses, and algorithms comprising the steps described herein, and also include the processes and modes of operation of the systems and servers described herein. Other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Figure 1:
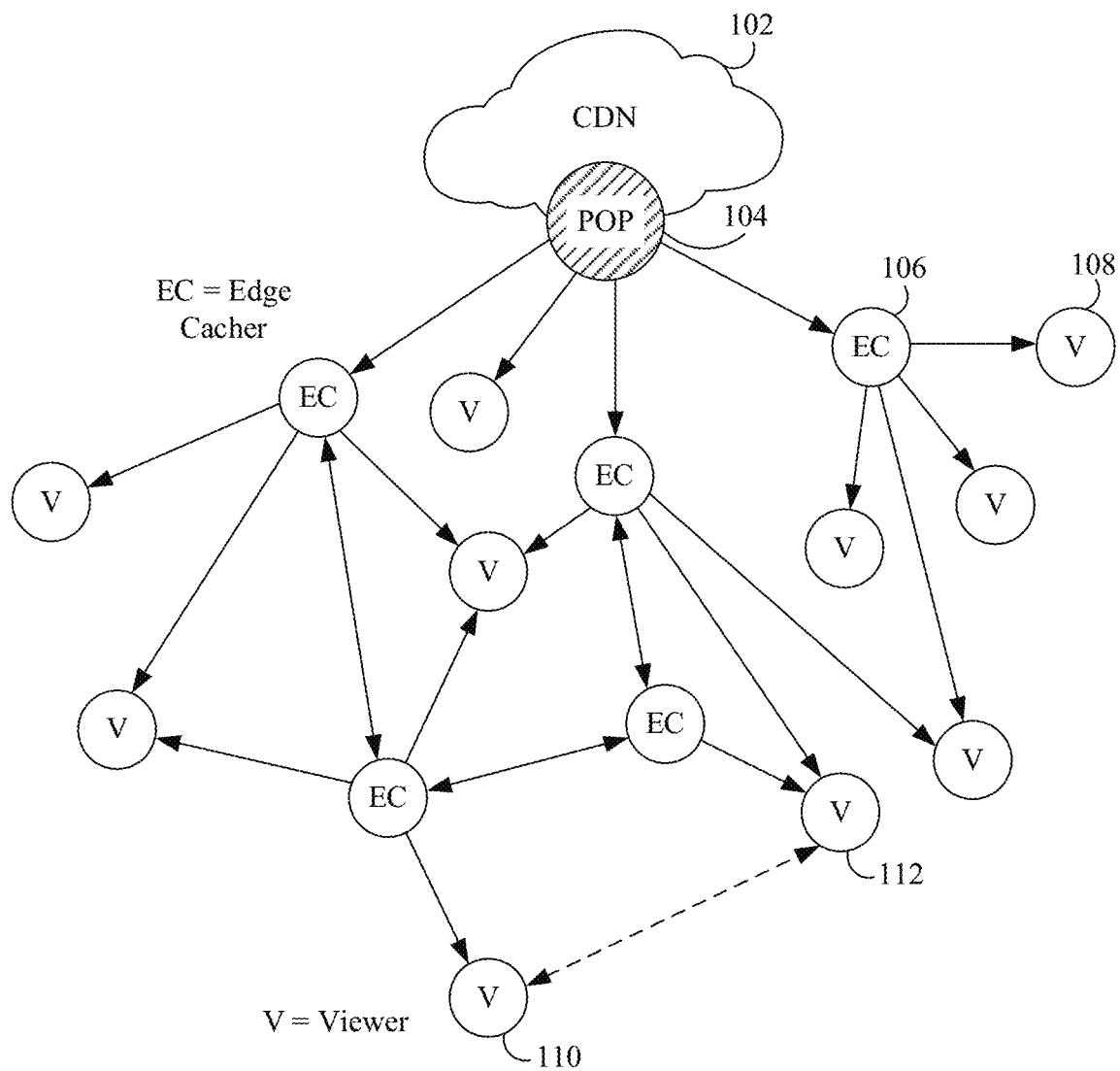
FIG. 1 is a network diagram illustrating a hybrid network architecture combining peer-to-peer networking with a traditional content delivery network (CDN), according to one embodiment of the disclosure.

In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon the invention.

THETA is a trademark name carrying embodiments of the present invention, and hence, the aforementioned trademark names may be interchangeably used in the specification and drawings to refer to the products/services offered by embodiments of the present invention. The term THETA may be used in this specification to describe the overall decentralized data streaming and delivery network or platform, the public ledger system for payment of bandwidth use or content streaming, as well as the company providing said network, platform, system, or service. With reference to the figures, embodiments of the present invention are now described in further detail.

Overview

Broadly, embodiments of the present invention relate to methods and systems for secure and efficient data distribution in a decentralized data delivery network (hereinafter, the "THETA network", "THETA edge network", or "THETA data delivery network"). Some embodiments of the present invention may utilize a hybrid architecture where peer-to-peer (P2P) data exchanges are facilitated on top of a traditional content delivery infrastructure. In some embodiments, data exchanges may be facilitated through the use of tracker servers, cachers, viewer client-side intelligence, and blockchain-based micropayment incentives for resource sharing.

Various embodiments of the present invention are applicable, but not limited to, decentralized peer-to-peer data content delivery systems and platforms, which often focus on timely delivery of data content under strict, near real-time parameters. Peer nodes may function as end users as well as caching relays that source data content to nearby peers, plus optionally connecting to a central content server when no close-by peer sources are available. To incentivize end users to join as caching nodes for sharing redundant bandwidth and storage resources, and to encourage more active engagement with content platforms and content creators, a decentralized public ledger system (hereinafter, the "THETA blockchain ledger system" or the "THETA blockchain") may be utilized to reward or compensate for caching and relaying data content to peer users at very fine granularities while offloading content distribution costs.

More specifically, in the current disclosure, "viewer" nodes refer to general end user clients that consume delivered data, including various content types, such as live multi-media streams, video-on-demand, binary large objects, encrypted data, text data, audio, software updates, ads, large static data files, and the like. Hereinafter, "viewers" and video streaming are discussed in exemplary embodiments, for illustrative purpose only, without limiting the scope of the methods, systems, and devices as disclosed herein, which are capable of delivering and/or consuming various content types with various reliability and latency requirements. Correspondingly, each network node is configured to support the different requirements of the various content types, such as the requirements of a live stream, Video-on-Demand (VoD), and other data types. Moreover, in a unified view of the data delivered within the network, different types of content may all be considered as data files. Each caching node may store chunks, fragments, or slices of a data file, and may support "range requests" to avoid the need to download a large chunk of the file when only a small fraction is needed. For example, a CDN server or caching node may serve data contents as data blobs, while also supporting byte-range requests.

In a traditional content distributing network (CDN), individual nodes are connected to a CDN server directly via a Point-of-Presence (POP) data center. On the other hand, nodes within a fully decentralized peer-to-peer (P2P) network share data directly with each other, without the need of a central server. That is, each peer node within a P2P network may be both a server/cacher or a client.

Peer-to-peer (P2P) data streaming often focuses on timely delivery of audio and video content under strict, near real-time parameters. P2P livestream delivery works best when many people tune in for the same stream at the same time. High concurrent user count means more peer resources are available, and thus peer nodes can pull data streams from each other more efficiently. Overall system capacity increases as more peer nodes become available. Moreover, robustness of the system is increased in a P2P network when compared to traditional CDNs, as nodes do not need to rely on a centralized server to retrieve content. This is especially important in cases of server failure. In contrast, for centralized CDN-based delivery, a high number of concurrent users places scalability pressures on the CDN servers.

On the other hand, a decentralized P2P blockchain-based network includes specific network nodes (e.g., nodes serving as miners) that serve to validate information through the solution of at least one cryptographic puzzle (e.g., a proof of work (PoW) puzzle, a proof of stake (PoS) based puzzle, combinations thereof, and the like) in return for some monetary reward (e.g., via cryptocurrency) and/or permission for particular actions to occur via the node.

In the THETA network, nodes that serve as miners or blockchain network nodes can also include data delivery network nodes and vice-versa; such a network and associated systems may be vulnerable to denial-of-service (DoS) attacks. A DoS attack refers to a technique to disrupt legitimate users' access to the network. In some aspects, the attack can be performed by overloading one or more nodes of the network with a large amount of data requests, leading to network congestion, as further discussed below.

In various embodiments, the disclosed systems may be used to reduce the likelihood of such attacks using verifiable delay functions (VDFs). VDFs refer to functions that require a predetermined number of computational cycles to complete. While VDFs and PoW/PoS both require an evaluator to spend some time to compute a puzzle, VDFs may involve sequential computations which cannot be parallelized, making specialized hardware not able to substantially speed up the puzzle computation. Non-limiting examples of VDFs may include iterative squaring in RSA groups, addition of points in elliptic curves, modular exponentiations, iteratively computing $\tau$ squarings in a Rivest-Shamir-Adleman (RSA) group, and the like.

Some illustrative verifiable delay functions (VDFs) are described in the references Dan Boneh et al., "*A Survey of Two Verifiable Delay Functions*," Aug. 22, 2018, and Dan Boneh et al., "*Verifiable Delay Functions*," Jun. 26, 2019, which are hereby incorporated by reference in their entireties herein.

In various embodiments, the disclosed systems may determine one or more parameters of the VDF, as discussed further herein. A given node of the network that solves the VDF can use the parameters to perform sequential computations and to generate requests for other nodes on the network (e.g., requests for additional streaming content from a node). In various embodiments, the parameters can include a difficulty level for the process of solving the VDF. Further, the difficulty may be determined based on a given computing element design (e.g., a design associated with an FPGA, an ASIC, a CPLD, a muti-core processor, and the like).

In more detail, a VDF $f(x)$ may include the property that, given a delay time t, the VDF is sequential in that a node can compute $f(x)$ in t sequential steps, but no malicious node with a large number of processors can distinguish the output of $f(x)$ from a random output in significantly fewer steps. Further, the VDF may include the property that it is efficiently verifiable, such that given an output of the VDF y, any observer (e.g., another node that serves content to the requesting node) can verify that $y=f(x)$ in a predetermined short amount of time (e.g., in log(t) time or less). Accordingly, a VDF may refer to a function that takes exponentially more time to compute (even on highly parallel processing elements) than it does to verify on a single processing element. Also, the probability of a verifying node (e.g., another node that serves content to the requesting node) accepting a false VDF output may be below a predetermined threshold, which may be determined by a user-selectable parameter. As noted, other nodes may be unable to distinguish the output of the VDF $f(x)$ from a random output until a final result is reached.

VDF on Client-Server Systems

In various embodiments, the disclosed systems may include a VDF-based rate limiting mechanism implemented in a client-server context (e.g., traditional client-server environment, an environment where the client-server may include two peer devices, etc.). More specifically, in a generic client-server setting, the client device can send one or more requests (e.g., API requests) to at least one server. When a server detects an abnormal request pattern (e.g. request rate too high, request sent from a suspicious IP address, combinations thereof, and the like), the server can issue a VDF challenge to the client. Accordingly, for the next API request, the client may need to present the VDF computation result. Otherwise, the server can reject the connection request from the client.

VDF on a Blockchain without Digital Rights Management (DRM)

In further embodiments, the above-described mechanism can be extended to a blockchain-supported decentralized peer-to-peer data delivery network. In one example, when a first exemplary peer node (e.g., a viewer peer node) of the network decides to generate a transaction and thereby request content from a second node (e.g., a cacher peer node), the first peer node (e.g., the viewer peer node) may need to solve a VDF having an input that includes the hash of a previous transaction issued by the second peer node (e.g., the cacher peer node). Further, in the verification phase, when a transaction is received by the second peer node (e.g., the cacher peer node), the second peer node may verify whether the VDF has been solved correctly and then forward the transaction (and the proof) to neighboring nodes, such as other cacher peer nodes within the network. If the VDF has not been solved correctly, the transaction may be discarded by the second peer node (e.g., the cacher peer node). In some embodiments, the VDF may include a parameter that determines or represents the difficulty of solving the VDF and can include or be based on, for example, the number of sequential operations to solve for the VDF. Further, the VDF and/or the parameters characterizing the VDF (e.g., the difficulty of solving the VDF) may be statically or dynamically updated based at least in part on one or more of a bandwidth, a computational capability, and/or a memory capability associated with one or more nodes of the network, a network organization/structure, a size or duration of a data file fragment to be transmitted, combinations thereof, and the like.

VDF and DRM on a Blockchain

In some aspects, the above-described mechanism can be extended to a blockchain-supported decentralized peer-to-peer data delivery network with digital rights management (DRM). In particular, after the second peer node (e.g., cacher peer node) has verified that the solution of the first peer node (e.g., the viewer peer node) is correct, the second peer node can be configured to generate an encrypted data stream and a corresponding data key to decrypt the data stream. Further, the second peer node (e.g., the cacher peer node) can transmit the encrypted data stream and the data key to the first peer node (e.g., the viewer peer node).

Decentralized Hybrid Network for Data Streaming and Delivery

In what follows, a THETA decentralized edge network and infrastructure are disclosed, methods for rate limiting protection with VDFs are presented, and designs for the THETA blockchain ledger system and smart contracts are also disclosed.

In a traditional content distributing network (CDN), individual nodes are connected to a CDN server directly via a Point-of-Presence (POP) data center. On the other hand, nodes within a fully decentralized peer-to-peer (P2P) network share data directly with each other, without the need of a central server. That is, each peer node within a P2P network may be both a server/cacher or a client.

Peer-to-peer (P2P) data streaming often focuses on timely delivery of audio and video content under strict, near real-time parameters. P2P livestream delivery works best when many people tune in for the same stream at the same time. High concurrent user count means more peer resources are available, and thus peer nodes can pull data streams from each other more efficiently. Overall system capacity increases as more peer nodes become available. Moreover, robustness of the system is increased in a P2P network when compared to traditional CDNs, as nodes do not need to rely on a centralized server to retrieve content. This is especially important in cases of server failure. In contrast, for centralized CDN-based delivery, a high number of concurrent users places scalability pressures on the CDN servers.

One shortcoming of pure P2P streaming is availability. Peers come and go at any time, which makes it difficult to predict the availability of any given peer node. There are also inherent differences and asymmetries in nodes, such as upload and download capacities. On the other hand, a CDN server is more reliable and robust, and hence it can serve as a reliable "backup" when requested data is not available from peer nodes.

Taking advantage of both P2P networks and a CDN network, FIG. 1 shows a network diagram 100 of a decentralized "hybrid network" combining the two, according to one embodiment of the present invention. Within this hybrid network 100, peer-to-peer connections among viewers ("V") 108 and edge cachers ("EC") 106 operate on top of an existing CDN 102, which itself comprises one or more point of presence ("POP") servers 104. As discussed previously, a "viewer" is a network node, end user, or client that consumes delivered data, while an "edge cacher" is a dedicated, intermediate relay node that caches and/or relays data to neighboring peer nodes. Although individual nodes are labeled as either a viewer or an edge cacher in FIG. 1, a node may function as both a viewer and an edge cacher simultaneously. For example, the dashed line between viewers 110 and 112 on the edge of the network represents a data link over which nodes 110 and 112 may transmit cached data to each other. In some other embodiments, peer nodes shown in FIG. 1 may simply be edge nodes capable of sharing/receiving one or more of storage, bandwidth, and computing resources to/from other peer nodes.

Hybrid mesh streaming utilizes both P2P nodes ("V" and "EC") and one or more CDN servers for data delivery, and thus combines the advantages of both; namely, high scalability of the P2P infrastructure along with the high availability of the CDN delivery backbone. One goal of this hybrid system is to achieve maximum CDN bandwidth reduction without sacrificing quality-of-service (QoS) critical to established streaming platforms such as NETFLIX, YOUTUBE, TWITCH, FACEBOOK and others. In a traditional CDN, every node pulls data streams directly from the POP server. In hybrid network 100, whenever possible, peer nodes may pull data from each other instead of from the POP server. That is, only a subset of nodes pull data streams from the POP server; other nodes simply pull data streams from their peer caching nodes which provide better and more efficient connections. Caching nodes thus augment the traditional CDN backbone with more caching layers for end viewers geographically far away from POPs of the CDN backbone. This hybrid architecture applies to both video on demand and live streaming scenarios, as well as other data streaming and delivery setups.

Figure 2:
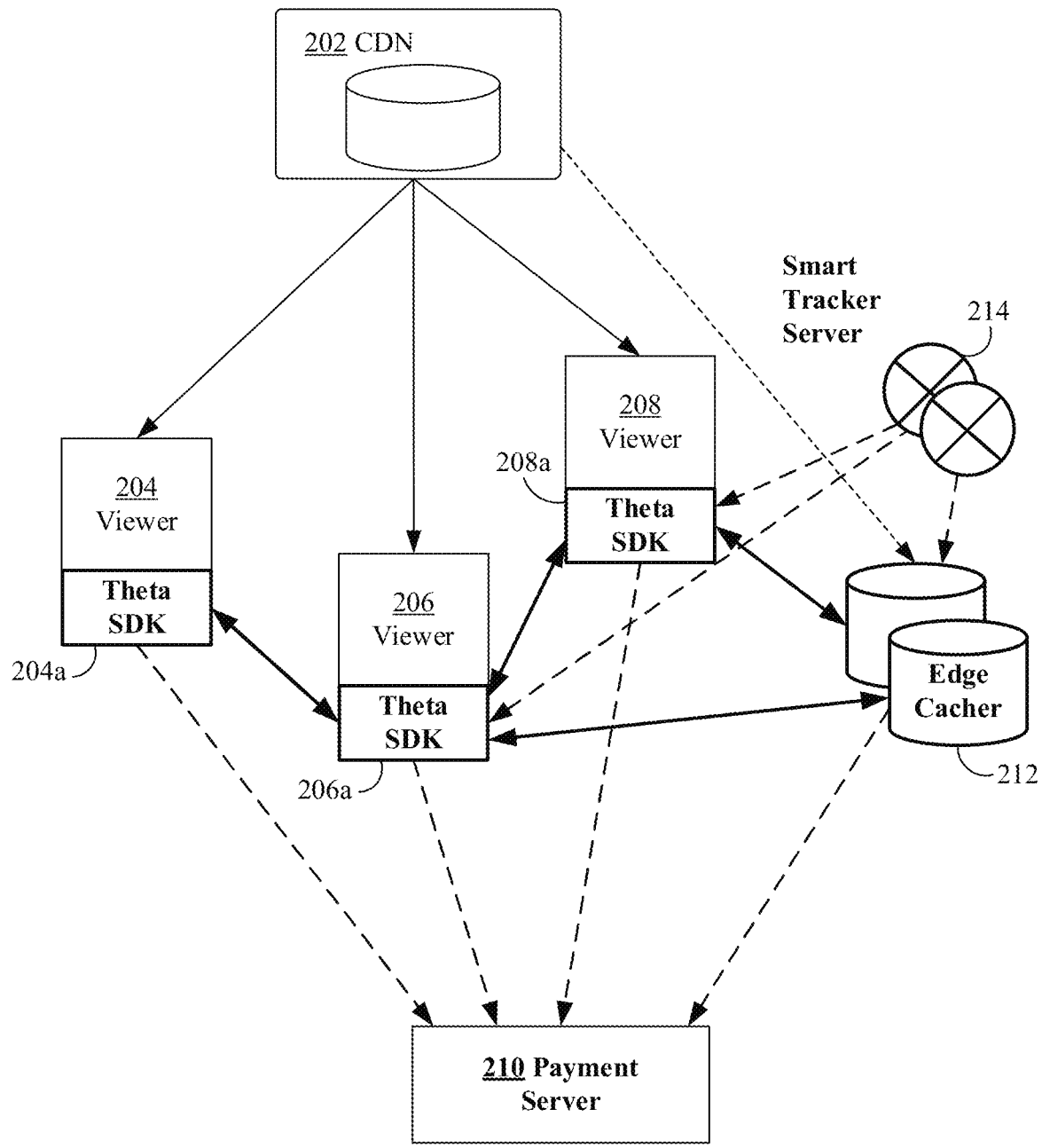
FIG. 2 is an illustrative network diagram showing a decentralized data streaming and delivery hybrid network with smart tracker servers and a payment server, according to one embodiment of the disclosure.

More specifically, FIG. 2 is an illustrative network diagram showing a decentralized, hybrid network 200, according to one embodiment of the present invention. In this illustrative example, hybrid network 200 comprises a CDN server or backbone 202, viewer nodes 204, 206, and 208, edge cacher 212, smart tracker servers 214, and a payment server 210. Viewers 204, 206, and 208, and edge cacher 212 are each connected directly to CDN 202, possibly through a POP server (not shown); viewers 204 and 206 are directly connected; viewers 206 and 208 are also directly connected, and both linked to edge cacher 212. In this hybrid structure, a viewer node may attempt to pull data from peers first, and only resort to downloading from the CDN 202 as a failure-proof backup. In addition to dedicated edge cacher 212, each viewer may serve as a cacher node as well.

Hybrid network 200 is designed to operate independently of, or on top of, an existing CDN, which provides content to a plurality of peer nodes 204, 206, and 208. Although only one CDN server 202 is shown for simplicity, hybrid network 200 can operate with multiple CDN servers. Hybrid network 200 may also operate independently of CDN server 202 when sufficient number of peer nodes are operating within the network.

In various embodiments, hybrid network 200 supports the transmission of various types of content types, such as but not limited to, live stream multimedia data, video-on-demand (VoD), large static data files (e.g., data blobs), system updates, game patches, advertisements, etc. In some embodiments, different types of content may all be viewed as data files, with each file divided into small segments, chunks, fragments, or slices. In this disclosure, a file "fragment" refers to a section, portion, or fraction of a data file, and may have different granularities or resolutions in different embodiments. A data file fragment may be further divided into smaller slices, possibly on a byte-wise scale. Hybrid network 200 may store file fragments or slices instead of entire files in all or a subset of its constituent peer nodes. Live streams may be viewed as files being generated and streamed at the same time. In one example, the viewers and edge cachers can support Web RTC (Real-Time Communications) HTTP/HTTPS protocols.

Accordingly, peer nodes 204, 206, and 208 may include different types of viewer and/or edge cacher clients capable of processing different content types. Although FIG. 2 shows edge cacher 212 as separated from viewer nodes 204, 206, and 208, one or more of peer nodes 204, 206, and 208 may simultaneously implement an edge cacher as well as an end user software using a THETA Software Development Kit (SDK) 204a, 206a and 208a, so that a viewer may store and distribute content via P2P connections while also consuming the content. Unlike some streaming services that require proprietary content viewers, such as video players to be installed, the THETA SDK may be integrated into a third-party application or device so that data content accessed by a peer node may be viewed or played within the third-party application. (A Software Development Kit (SDK) is a set of software development tools or programming packages for creating applications for a specific platform. An SDK may be compiled as part of the developed application to provide dedicated interfaces and functionalities. Alternatively, an SDK may be an individually compiled module, incorporable into an existing application or player as a plug-in, add-on, or extension in order to add specific features to the application without accessing its source code.)

In various embodiments, peer nodes 204, 206, and 208 may each implement different types of client software that enable different functionalities. A peer node 212 which implements an edge cacher may store fragments of the content, or slices within the fragments, to be delivered. The slices may be transmitted to requesting peers as needed. A peer node functioning as an edge cacher 212 may be viewed as having two local cache layers, a memory and a hard drive. Such a peer node 212 may implement a unified cache lookup strategy, where the memory is first accessed, and a hard drive may then be accessed for retrieving the requested content. However, it may be noted that some clients may not have hard drive storage (such as a mobile phone), in which case edge cacher 212 may be implemented as a single local cache. Therefore, an abstracted cache interface may be enabled so that devices with or without hard drives can act as edge cacher nodes within hybrid network 200. Such nodes may be used to share live streams and concurrent VoD which are stored in memory. In the case of patch updates, a hard drive is typically required as the patch updates are stored on the hard drive.

The various content types supported by hybrid network 200 may have different delay or latency requirements. For example, livestreams require real-time or near real-time delivery, while VoD may require real-time delivery for the portion that a user is currently watching. Data blobs may not require real-time support, but download time needs to be minimized nonetheless. In order to support the relaying or propagation of large files, a "range request," where a content fragment may be further divided into smaller slices and only a slice is requested and sent, may be supported in hybrid network 200. For example, CDN server 202 may support a range request while also able to provide a data blob as a complete large file.

Hybrid network 200 may additionally include one or more smart tracker servers 214 for managing the storage and consumption of data content within hybrid network 200. Smart trackers 214 provide guidance to edge cacher 212 in storing and delivering data, and may handle an unbounded number of live streams, VoD data, or data blobs concurrently. Smart trackers 214 may be implemented with a microservice architecture which comprises a signaling service and a discovery service, for example.

Guided by smart trackers 214, cacher nodes (edge cachers and viewers) may self-organize into semi-randomly connected networks based on network distance or their geolocations. In one example, physical distances may be estimated and nodes within a certain threshold distance may be selected for P2P data sharing. In some embodiments, cacher nodes are not partitioned into clusters to simplify backend design and to improve robustness of the network. The network therefore continues to function if any cacher node leaves the network, so that even if only one viewer node remains, this viewer node can still pull data directly from CDN 202. As more cacher nodes are added to the network, the network becomes more efficient and achieves higher CDN offload.

Furthermore, peer nodes shown in FIG. 2 may be communicatively coupled to a payment server 210 which facilitates and manages payment transactions among viewers 204, 206, and 208 and edge cacher 212 when data contents are distributed. One or more instances of the payment server 210 may be implemented in hybrid network 200, as a dedicated network node, or physically co-located with another network node, such as CDN server 202, smart trackers 214, or any peer node within hybrid network 200. For example, the payment server 210 may be co-located with the smart tracker 214, where each is implemented as a software module. While smart tracker 214 determines P2P connections among peer nodes based on factors such as geographical distances and resource availabilities, it may also determine payment authorization groups, where only members of a group may exchange payments for participating in P2P content distributions. In various embodiments, the payment server 210 may be implemented as a stand-alone payment service software module, or as part of the THETA SDK. In the exemplary embodiment shown in FIG. 2, peer nodes 204, 206, 208, and 212 are each individually connected to the payment server 210. Additionally, in some embodiments, the payment server 210 may be provided by a third-party, different from source CDN 202 as owned by a content distribution platform; in yet some embodiments, a content distribution platform may run the payment server 210 itself.

In some embodiments, when two edge cachers exchange data, tit-for-tat compensation via traditional means (e.g., off-chain settlements between trusted parties) may be used, and no cryptocurrency payment is involved. On the other hand, trustless viewer nodes may pay edge cachers micropayments for relaying data through a resource-orientated micropayment pool, disclosed in co-pending application U.S. Ser. No. 16/726,148, filed on 23 Dec. 2019, entitled "Methods and Systems for Micropayment Support to Blockchain Incentivized, Decentralized Data Streaming and Delivery," incorporated by reference herein.

THETA Blockchain-Based Ledger System with Digital Rights Management (DRM)

While FIGS. 1 and 2 provide architectural details of a THETA data delivery network, in what follows, a more global, abstracted view of the network is presented for clarity. Having provided contextual FIGS. 1 and 2 for the various embodiments of the invention, FIGS. 3-6 are provided to show details and further embodiments of the present invention.

Figure 3:
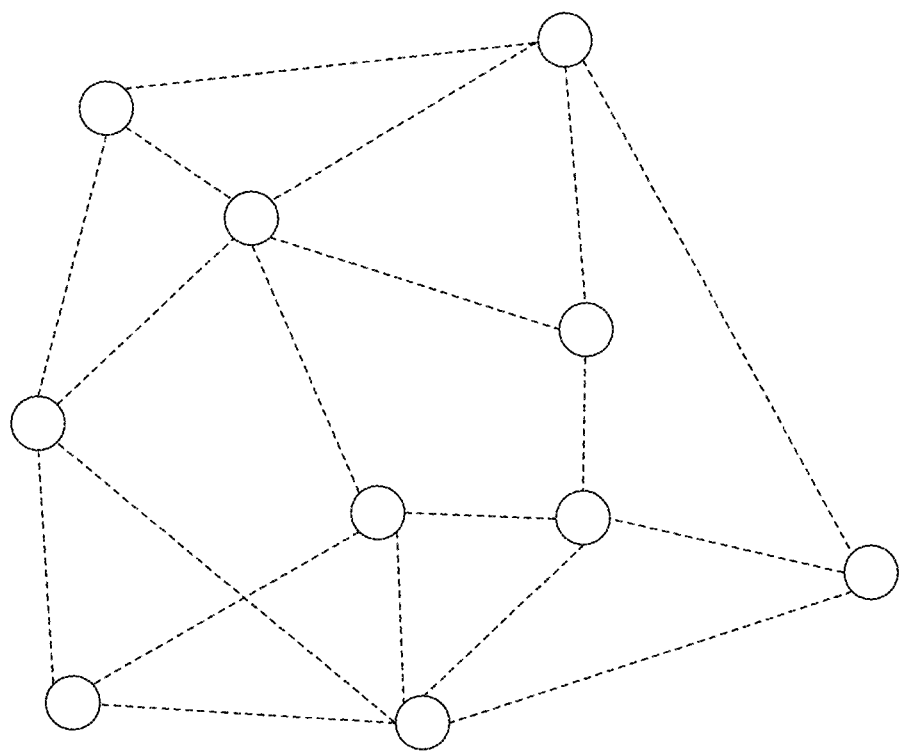
FIG. 3 shows a diagram for at least a portion of a decentralized edge network, in accordance with example embodiments of the disclosure.
Figure 3:
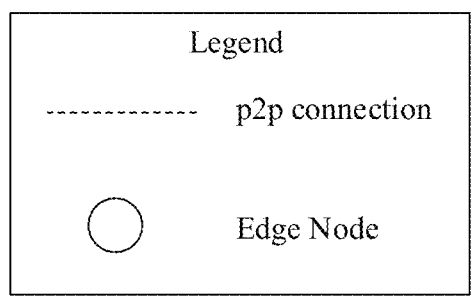

FIG. 3 shows a diagram 300 for at least a portion of a decentralized edge network, in accordance with example embodiments of the disclosure. In particular, diagram 300 illustrates a fully distributed edge node network comprising edge nodes connected via peer-to-peer (P2P) connections. Further, the THETA edge nodes can form a peer-to-peer network with direct connections between nodes that are in geographical proximity with one another. For example, a first node may be closer than a predetermined distance away from a second node (e.g., about 2 miles).

More specifically, nodes in FIG. 3 are labeled as "edge nodes." An "edge node", "edge cacher", or "edge worker" as disclosed herein is a dedicated type of node that supports the relaying and propagation of data files during content distribution, or that supports computational resource sharing with other peer nodes. That is, an edge node is a peer node capable of sharing available local resources with other peers upon request. An edge node may run on desktops, mobile devices, and server machines. It may partition a portion of local storage for caching high-demand data files such as live video streams, while content types such as software patches or other updates are often stored on local hard drive. That is, an edge cacher may interact with a machine's data storage to implement two local cache layers, a local memory and a local hard drive. In some embodiments, an edge node may allocate a portion of its CPU time or cycles to perform one or more task functions as initiated by another peer node. In some embodiments, an edge node may serve as a task initiator to assign computation tasks to other peer nodes.

In some embodiments, a peer node in the THETA network may function as both an edge cacher node and a viewer node. In some embodiments, a peer node in the THETA network may function as both a task initiator node and a task worker node.

In establishing the decentralized edge network shown in FIG. 3, any appropriate peer discovery techniques may be used. For example, in a data delivery network, "smart trackers" may be used to guide edge nodes (viewers, edge cachers) to self-organize into a semi-randomly connected network based on network distance and/or geo-locations, and to provide intelligence to cacher nodes to store and distribute data content among peers of the network. A tracker server may handle a very large number or an unbounded number of data streams or blobs effectively. Its function may be implemented with a micro-service architecture consisting of one or more of a signaling service, a grouping service, a stats service, an authenticity service, and a private API service.

In short, the THETA network combines the advantages of P2P and CDN techniques to achieve high scalability and high resource availability and attains at least the following characteristics: The THETA network can be self-organizing, self-adaptive, self-evolving, featuring reduced or minimal operational overhead, and highly available and robust. The THETA network can feature a plug and play architecture whereby a network node can join or leave at any time. Further, the THETA network can serve to support the delivery of various types of content (e.g., livestream, video on demand (VoD), data blob, etc.) within a unified data retrieval framework. In another embodiment, the THETA network can be highly secure, be Digital Rights Management (DRM) compatible, and be General Data Protection Regulation (GDPR) compatible. In yet another embodiment, the THETA network supports distributed computing with blockchain and smart contract-facilitated incentives.

Further details of the THETA decentralized data streaming and delivery network architecture is provided in U.S. Pat. No. 10,771,524, issued on 8 Sep. 2020 (U.S. Ser. No. 16/751,772, filed on 24 Jan. 2020), entitled "Methods and Systems for a Decentralized Data Streaming and Delivery Network," the entire disclosure of which is hereby incorporated by reference in its entirety herein.

Figure 4:
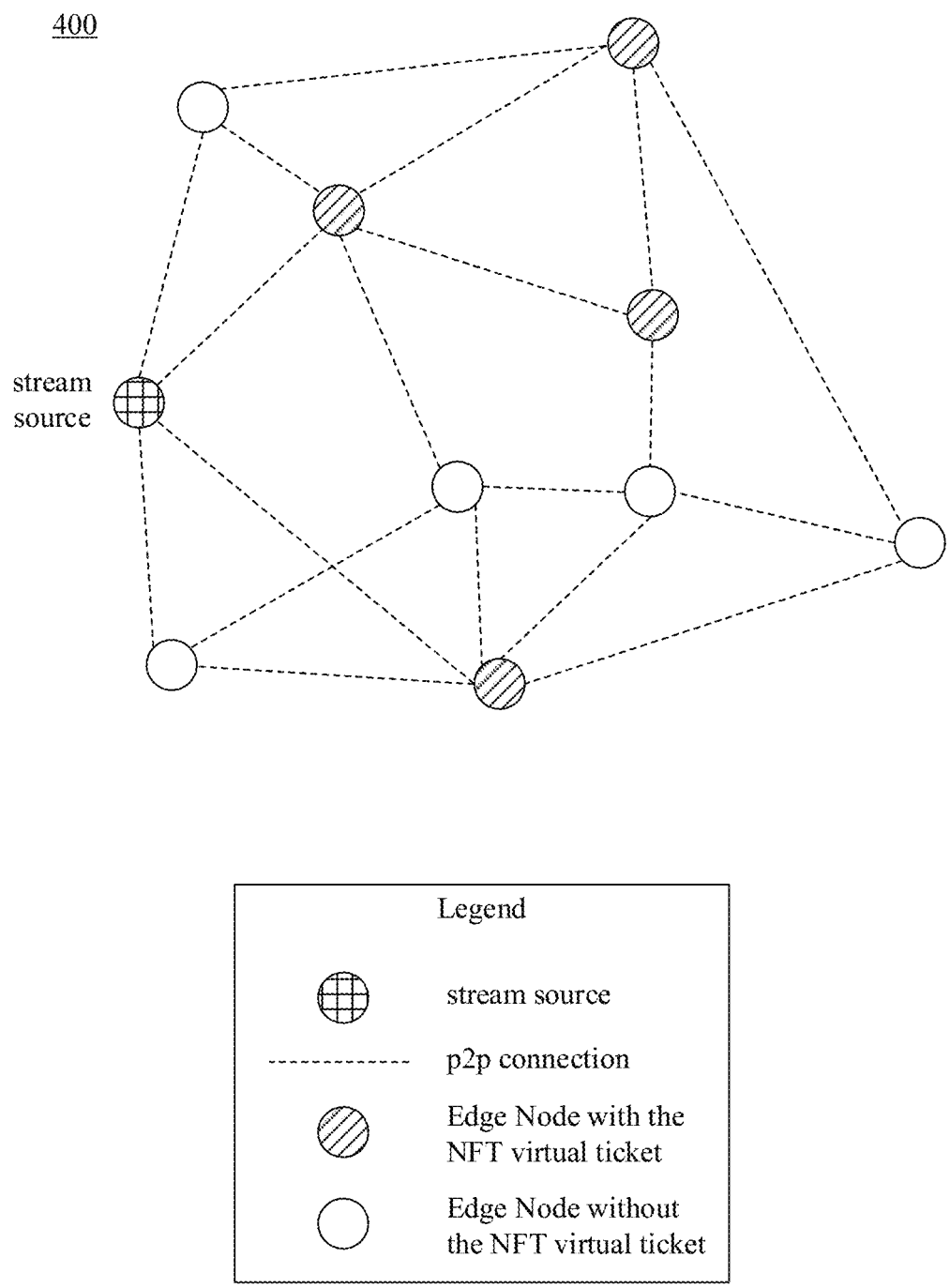
FIG. 4 shows a diagram illustrating at least one technique associated with the distribution of data on the decentralized edge network, in accordance with example embodiments of the disclosure.

FIG. 4 shows a diagram 400 illustrating at least one technique associated with the distribution and delivery of content on the decentralized edge network, in accordance with example embodiments of the disclosure. In particular, diagram 400 represents a stream advertisement and discovery process used with digital rights management (DRM) in some embodiments of the present invention. Specifically, a stream source can send out an intent to stream over the P2P network through a publication/subscription (pub/sub) method in order to advertise the stream source's stream ahead of time (i.e., before it streams content to another node). Further, the stream source may publish an associated smart contract on a corresponding blockchain (e.g., a THETA blockchain). As used herein, a smart contract refers to a self-executing contract or self-enforcing agreement in the form of computer programming codes/instructions managed by/stored on a blockchain. In some aspects, a smart contract can be automatically executed when predetermined or preexisting terms and conditions are met, or when an agreement between participating parties (e.g., nodes) are reached (confirmed via electronic signatures). In some embodiments, the publishing of the smart contract can allow interested viewers and corresponding nodes to purchase a token (e.g., a non-fungible token (NFT), that can correspond to a virtual ticket) for the stream using a corresponding cryptocurrency (e.g., THETA FUEL (TFUEL), a type of gas token utilized by the THETA blockchain network). As noted, in some embodiments, the disclosed systems can use the pub/sub method to stream content. Further, the pub/sub method may resemble subscription services similar to a subscription server used in connection with an online-enabled video platform. In another embodiment, the use of the pub/sub method can allow users (e.g., viewer nodes) to subscribe to one or more updates from their favorite streamers/influencers that distribute content via the nodes on the peer-to-peer network.

As used herein, a "non-fungible token" (NFT) refers to a type of digital asset similar to a cryptocurrency, but for which each NFT has its own unique information, attributes, or characteristics. An NFT may comprise permanent, unalterable metadata that describes or defines its authenticity, and may be transferrable in terms of ownership. However, unlike a cryptocurrency token like Bitcoin, an NFT is typically indivisible. Thus, an NFT can have uses on decentralized networks because of the NFT's feature of functioning as a proof of ownership, for example, in authenticating copyrights, digital, assets, and digital and real-world identities. More details on the use of NFTs for DRM in the THETA edge network is provided in co-pending U.S. patent application Ser. No. 17/218,245, filed on 31 Mar. 2021, entitled "Non-Fungible Token (NFT) Based Digital Rights Management in a Decentralized Data Delivery Network", the entire disclosure of which is hereby incorporated by reference in its entirety herein.

Figure 5:
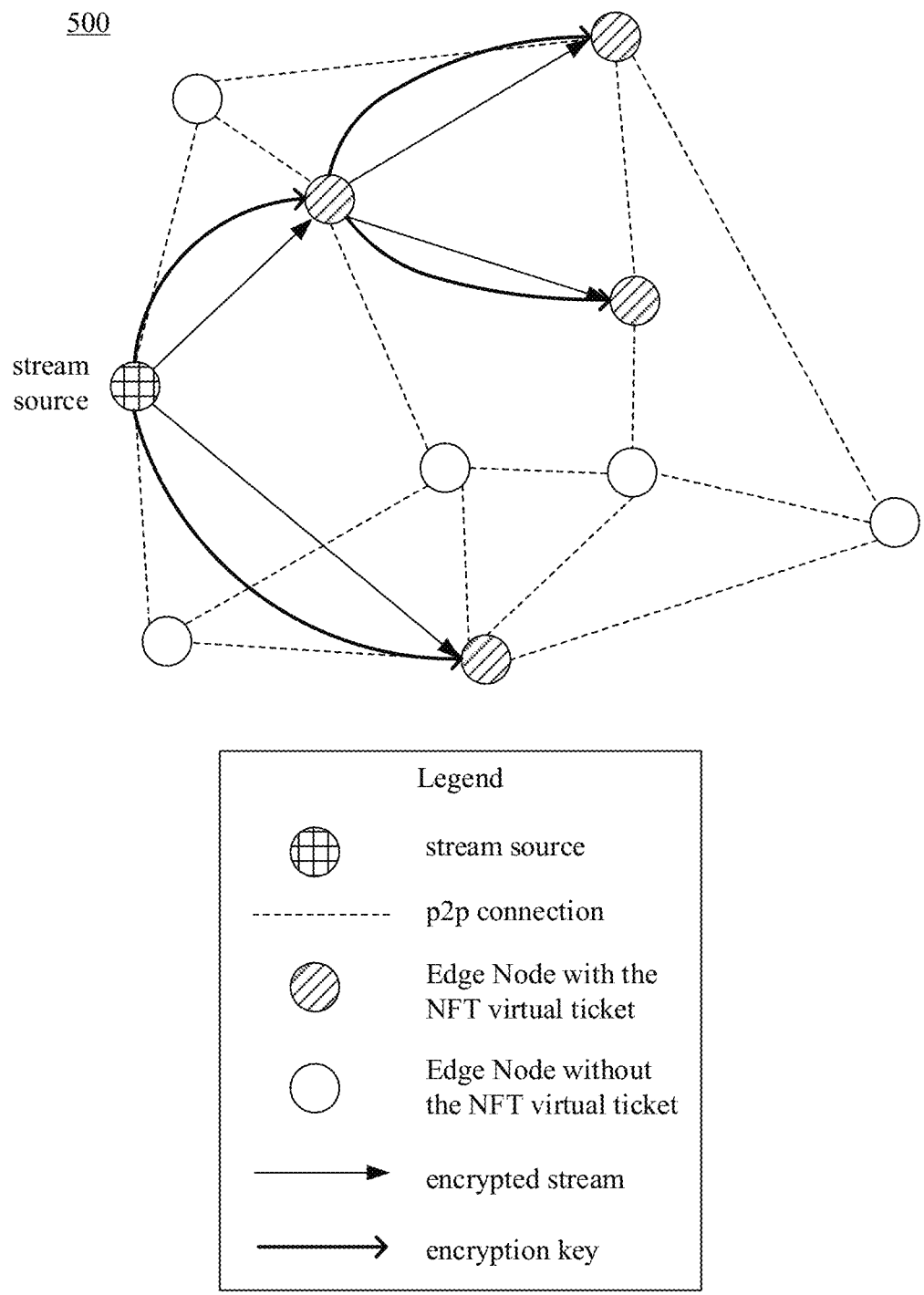
FIG. 5 shows a diagram illustrating at least one example technique for encrypted video stream delivery, in accordance with example embodiments of the disclosure.

FIG. 5 shows a diagram 500 illustrating at least one example technique for encrypted video stream delivery, in accordance with example embodiments of the disclosure that utilized DRM for digital content security. In particular, diagram 500 illustrates a streaming source node that can be configured to generate an encrypted data stream and a corresponding data encryption key. Further, the disclosed systems can be configured, in some embodiments, such that when a given streaming session starts, the source node can push the encrypted stream and the encryption keys to a sub-network formed by the nodes that purchased a token (e.g., the NFT-based virtual ticket) for that content.

As used herein, the term "data key" represents a key that can be used to decrypt the data stream received from the source edge cacher node. In other aspects, the disclosed systems can use a "transaction key" that can include key pairs (e.g., public and private keys for blockchain-based transactions). Accordingly, the disclosed systems can use two different keys, a transaction key which can be used for blockchain transactions and another data key, which can be used for encrypting and decrypting a data stream between nodes.

Rate Limiting Protection with Verifiable Delay Functions (VDFs)

In various aspects, blockchain-based networks may use a proof-of-stake (PoS) as a consensus mechanism by which the blockchain network achieves distributed consensus. In PoS-based blockchain networks, a creator of a next block on the blockchain may be chosen via various combinations of random selection and wealth or age (i.e., the stake). In another aspect, blockchain-based networks may use a proof-of-work (PoW) as a mechanism to confirm transactions and produce new blocks to the chain. With PoW, nodes that serve as miners can compete against each other to complete transactions on the network and get rewarded (e.g., via cryptocurrency). In some embodiments, the disclosed systems can be configured to operate using a rate limiting mechanism involving verifiable delay functions (VDFs), to be described further below. Further, in various respects, the disclosed systems can use the rate limiting mechanism in combination with PoW and/or PoS, and/or using an authentication-free rate limiting mechanism through PoW and/or PoS. In other aspects, the disclosed systems can replace PoW with a VDF for verifying a creator of a next block on the blockchain and/or to verify the identity of a node in order to authorize the node's interaction with the blockchain. In particular, the disclosed systems can be used in association with mechanisms to incorporate VDF in a consensus protocol as further shown and described in "Nakamoto Consensus with Verifiable Delay Puzzle" (arXiv:1908.06394 [cs.DC]), which is incorporated by reference in its entirety herein.

Having described an overview of some example embodiments, an example use case is presented next. In particular, a first node of the network can detect that a second node (e.g., another node on the network requesting data, such as media) is issuing requests at a rate that is greater than a predetermined threshold (e.g., is higher than a statistically determined average rate). In some embodiments, the first node can issue, to the second requesting node, a VDF with a random seed (which may be referred to as a "challenge"). Accordingly, the next request from the second requesting node may need to contain a correct solution to the VDF in order for the second requesting node to receive authorization to send and receive data to other nodes on the blockchain. As noted, one advantage of using a VDF (e.g., over a PoW technique) can include the fact that the VDF computation may not be substantially parallelizable. Accordingly, by this mechanism, if one or more malicious nodes in the network attempt to launch a Distributed Denial of Service (DDoS) attack to the other nodes, such other nodes can use this VDF-based rate-limiting mechanism to defeat the malicious node's persistent and high-volume requests by reducing the rate of the requests to a manageable level (e.g., a level below a predetermined level).

Using VDFs to Defend Against Attack in Client-Server Networks

Figure 6:
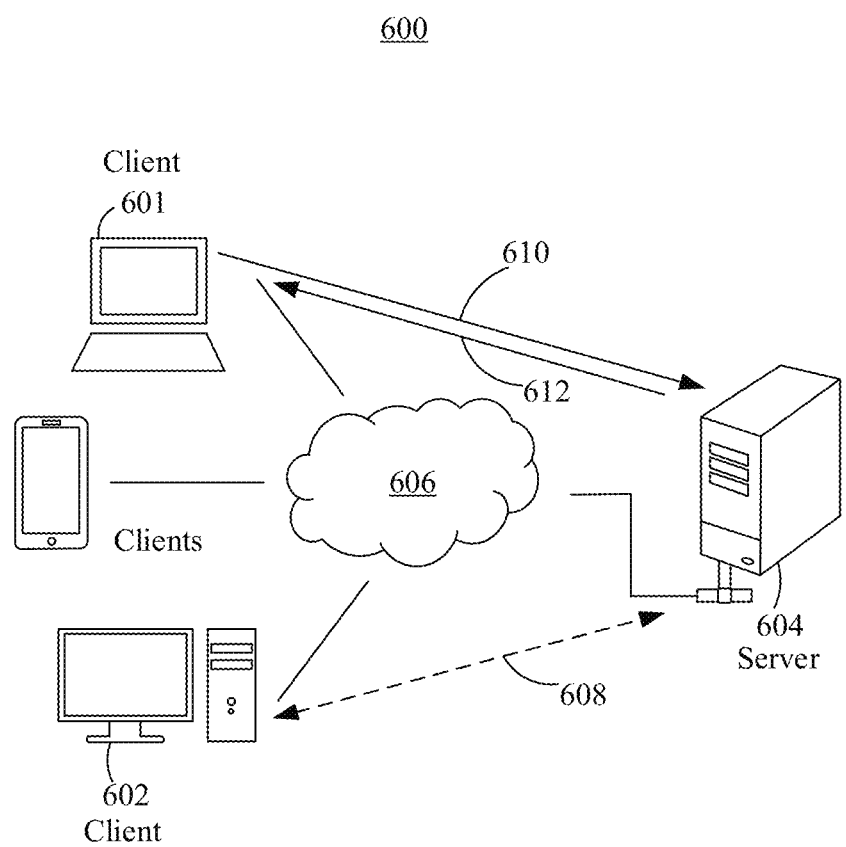
FIG. 6 is an illustration of an exemplary diagram showing example operations of the disclosed systems in a first architecture, in accordance with example embodiments of the disclosure.

FIG. 6 is an illustration of an exemplary diagram 600 showing example operations of the disclosed systems in a first architecture, in accordance with example embodiments of the disclosure. In particular, the first architecture can include clients such as clients 601 and 602 and a server 604 connected over a network 606. While one server 604 and three client devices are shown in the first architecture, the disclosed embodiments can include any suitable number of servers and/or client devices. In various embodiments, the disclosed VDF-based rate limiting mechanism can be implemented in a portion of the disclosed system, for example, between the honest client 602 and the server 604. As noted, the honest client 602 and the server 604 can include peer devices on a network 606 (e.g., a wired network or a wireless network). More specifically, the honest client 602 can send one or more requests 608 for a service (e.g., application programming interface (API) requests or the like) to the server 604 over network 606. The honest client 602 will receive a response to the request for the service from the server 604.

Conversely, if a malicious client 601 exhibits suspicious activity, the server 604 can modify its operations to prevent potential attacks from suspicious (or malicious) client 601. In particular, when a server 604 detects an abnormal request pattern 610 (e.g. a request rate exceeding a predetermined threshold, a request sent from a suspicious IP address (e.g., blacklisted address), combinations thereof, and the like), the server 604 can issue a VDF challenge 612 to the suspicious client 601. Accordingly, for the next API request, the suspicious client 601 may need to present the VDF computation result. Otherwise, the server 604 can reject the connection request from the suspicious client 601.

Using VDFs to Defend Against Attack in Edge Node Networks

Figure 7:
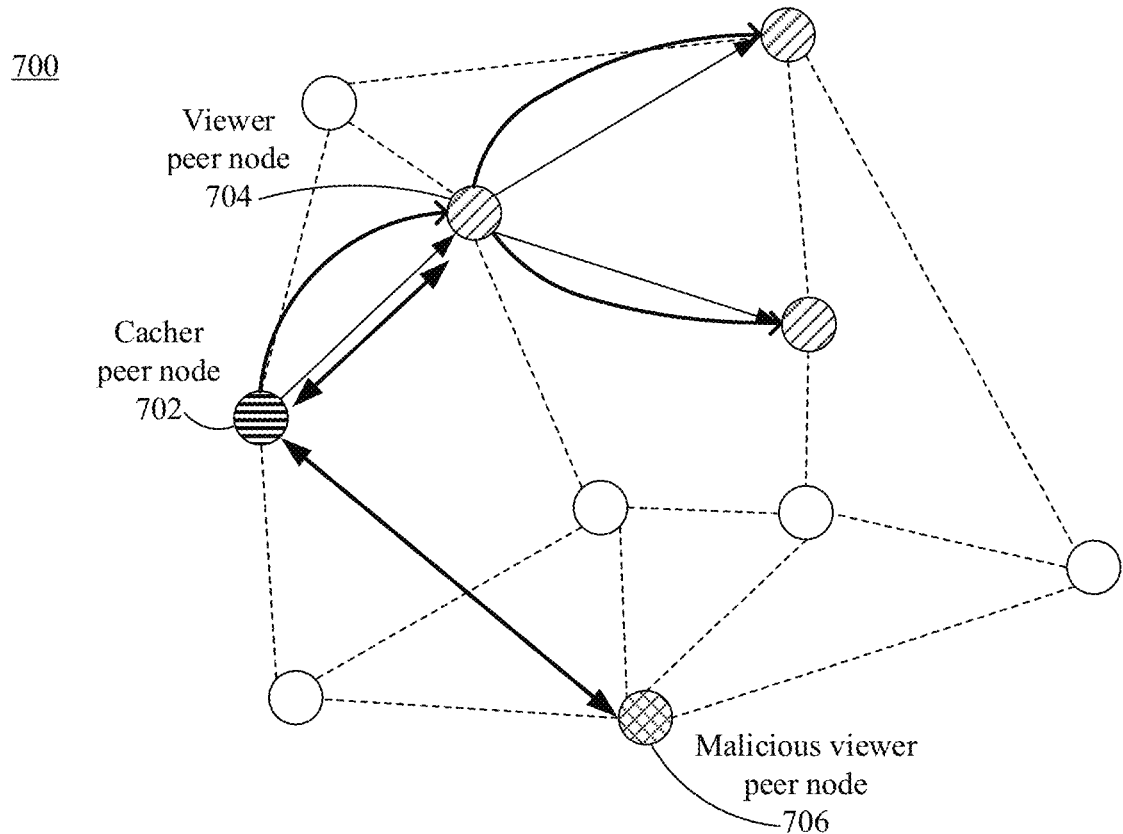
FIG. 7 is an illustration of an exemplary diagram showing example operations of the disclosed systems in a second architecture, in accordance with example embodiments of the disclosure.

FIG. 7 is an illustration of an exemplary diagram 700 showing example operations of the disclosed systems in a second architecture, in accordance with example embodiments of the disclosure. In particular, diagram 700 shows an architecture in which the disclosed systems operate in connection with a blockchain based decentralized peer-to-peer network. In particular, a cacher peer node 702 of the decentralized system can communicate with various viewer peer nodes such as viewer peer node 704. In particular, the cacher peer node 702 can serve as a relayer of data content (e.g., media streaming content, metadata, additional data, combinations thereof, and the like) and/or can generate some data content to one or more of the viewer peer nodes. In some situations, the cacher peer node 702 may receive a request for content from the viewer peer node 704. The cacher peer node 702 can ordinarily transmit whatever relevant content that the cacher peer node 702 has to the requesting viewer peer node 704.

However, in some cases, the requesting viewer peer node may be a malicious viewer peer node 706 that may intend to initiate an attack on the network by overwhelming the cacher peer node 702, for example, by flooding the cacher peer node 702 with many requests for content within a predetermined threshold of time. For example, the cacher peer node 702 may be capable of transmitting about 5 ms of content to a given viewer peer node at a time. Ordinarily, the viewer peer node 704 can make a first request for a first portion of content and can receive an approximately 5 ms block of the content from the cacher peer node 702. Then, in the next interaction between the viewer peer node 704 and the cacher peer node 702, the viewer peer node 704 can, at some point during the playback of the content (e.g., at the 3 ms mark), request an additional block of content (e.g., another 5 ms block of content) from the cacher peer node 702. The cacher peer node 702 can oblige such a request, at least because the system is able to support such traffic throughput (e.g., via a suitable methodology such as a queuing mechanism, and/or via one or more hardware features such as networking, compute, or memory resources, etc.). However, a malicious peer viewing node 706 may make many more requests, for example, as part of a DoS attack, for additional blocks of content from the cacher peer node 702, for example, during the playback of the first block of content received from the cacher peer node 702. Accordingly, the cacher peer node 702 may not be able to supply the requested amount of content to the malicious viewer peer node 706 and therefore, the DoS attack can affect the cacher peer node's 702 ability to service other users.

In some embodiments, the cacher peer node 702 can, in order to reduce or prevent the above situation, provide a VDF to the malicious viewer peer node 706 to solve along with the first block of content to playback. The cacher peer node 702 can wait for the solution of the VDF to be received from the malicious viewer peer node 706 prior to accepting a request for additional content and transmitting the second content to the malicious viewer peer node 706. Accordingly, this mechanism can limit the number of requests from the malicious viewer peer node 706 that the cacher peer node 702 services in a given period of time. Further, given that the malicious viewer peer node 706 may have computational capabilities that may allow the viewer peer node 706 to solve the VDF in a relatively quick manner (e.g., faster than a predetermined threshold period of time), the cacher peer node 702 can, in some embodiments, first query the malicious viewer peer node 706 for one or more of the viewer peer node's 706 capabilities (e.g., computational capabilities). Accordingly, the cacher peer node 702 can modify the difficulty of the VDF (which can correspond to the amount of time taken by the malicious viewer peer node 706 to solve the VDF) in order to prevent the malicious viewer peer node 706 from defeating this request rate limiting mechanism by way of additional capabilities, such as greater computational efficiency.

Flowchart for Using VDFs to Defend Against Attack in Client-Server Networks

Figure 8:
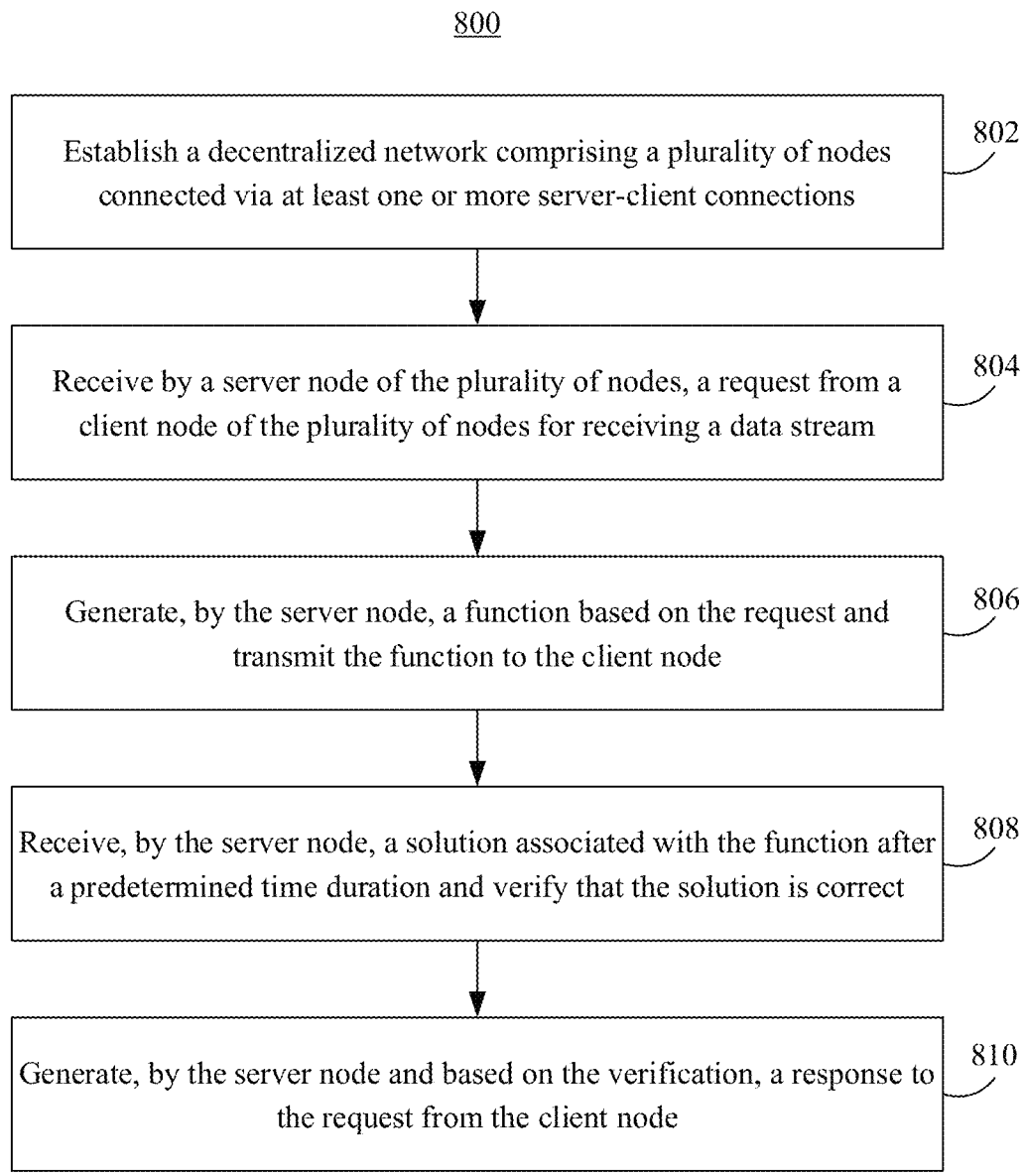
FIG. 8 is an illustration of an exemplary flowchart showing example operations of the disclosed systems, in accordance with example embodiments of the disclosure.

FIG. 8 shows an example flowchart 800 for a computer-implemented method utilized by a server device for reducing malicious attacks on a client-server network, in accordance with example embodiments of the disclosure. In particular, at block 802, a network may be established, the network comprising a plurality of nodes connected via at least one or more server-client connections. At block 804, a server device of the plurality of nodes may receive a request for a service from a client device of the plurality of nodes. The server device may determine that the client device is suspicious (or potentially malicious) based on the request. At block 806, the server device may generate a function (e.g., a VDF challenge) based on the request, and transmit the function to the client device. At block 808, the device node may receive a solution associated with the function after a predetermined time duration and verify that the solution is correct. At block 810, the server device may generate, based on the verification, a response to the request for the service from the client device.

In one embodiment, the verifiable delay function (VDF) is selected from the group consisting of iterative squaring in RSA groups, addition of points in elliptic curves, modular exponentiations, and iteratively computing τ squarings in a Rivest-Shamir-Adleman (RSA) group.

In another embodiment, the predetermined time duration may include a duration to solve the function, and the duration to solve the function is not reduced below a predetermined threshold by parallelizing operations to solve the function.

In another embodiment, the computer-implemented method further includes, determining, by the server device, a parameter associated with the client device; and determining, by the server device and based on the parameter, a type of the function. In some embodiments, the parameter comprises a difficulty of solving the function. In other embodiments, the determination of the parameter is based on a computational capability of the client device.

In one embodiment, the generation of the function is based on receiving, by the server device from the client device, a number of requests for receiving the service, the number of requests exceeding a predetermined threshold in a second predetermined time duration. In another embodiment, the server device tags the client device as a malicious node based on the number of requests exceeding the predetermined threshold in the second predetermined time duration.

Flowchart for Using VDFs to Defend Against Attack in Edge Node Networks

Figure 9:
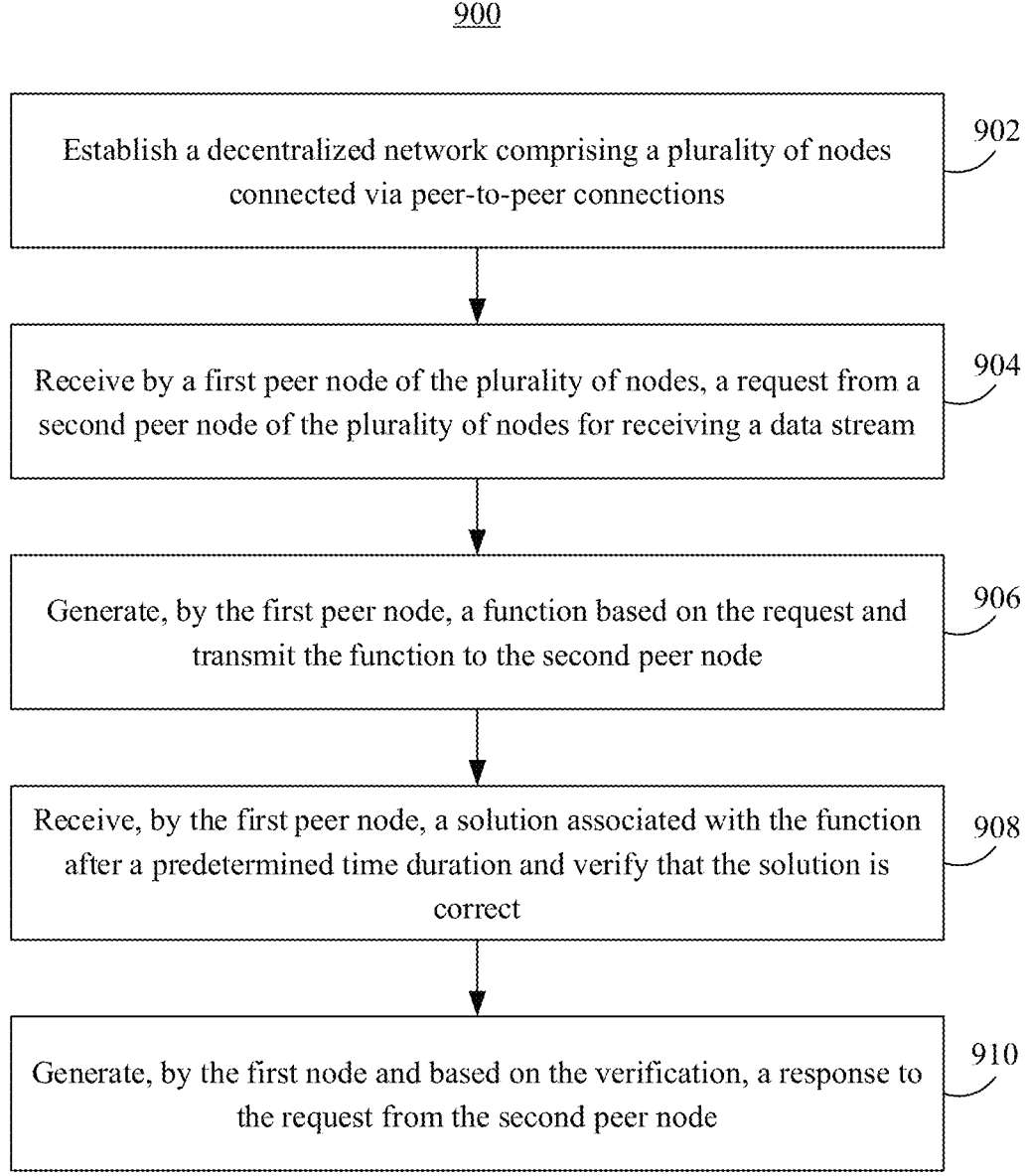
FIG. 9 is an illustration of a second exemplary flowchart showing additional example operations of the disclosed systems, in accordance with example embodiments of the disclosure.

FIG. 9 shows an example flowchart 900 for use in connection with a decentralized network in which a computer-implemented method serves to reduce malicious attacks on the decentralized network. In particular, at block 902, the decentralized network may be established, the network comprising a plurality of nodes connected via peer-to-peer connections. At block 904, a first peer node of the plurality of nodes can receive a request for a service from a second peer node of the plurality of nodes. The first peer node may determine that the second peer node is suspicious (or potentially malicious) based on the request. At block 906, the first peer node may generate a function (e.g., a VDF challenge) based on the request, and transmit the function to the second peer node. At block 908, the first peer node may receive a solution associated with the function after a predetermined time duration and verify that the solution is correct. At block 910, the first peer node can generate, based on the verification, a response to the request for the service from the second peer node.

In one embodiment, the verifiable delay function (VDF) is selected from the group consisting of iterative squaring in RSA groups, addition of points in elliptic curves, modular exponentiations, and iteratively computing τ squarings in a Rivest-Shamir-Adleman (RSA) group.

In another embodiment, the predetermined time duration may include a duration to solve the function, and the duration to solve the function is not reduced below a predetermined threshold by parallelizing operations to solve the function.

In another embodiment, the computer-implemented method further includes, determining, by the first peer node, a parameter associated with the second peer node; and determining, by the first peer node and based on the parameter, a type of the function. In some embodiments, the parameter comprises a difficulty of solving the function. In other embodiments, the determination of the parameter is based on a computational capability of the second peer node.

In one embodiment, the generation of the function is based on receiving, by the first peer node from the second peer node, a number of requests for receiving the service, the number of requests exceeding a predetermined threshold in a second predetermined time duration. In another embodiment, the first peer node tags the second peer node as a malicious node based on the number of requests exceeding the predetermined threshold in the second predetermined time duration.

Flowchart for Using VDFs to Defend Against Attack in Data Streaming Networks

Figure 10:
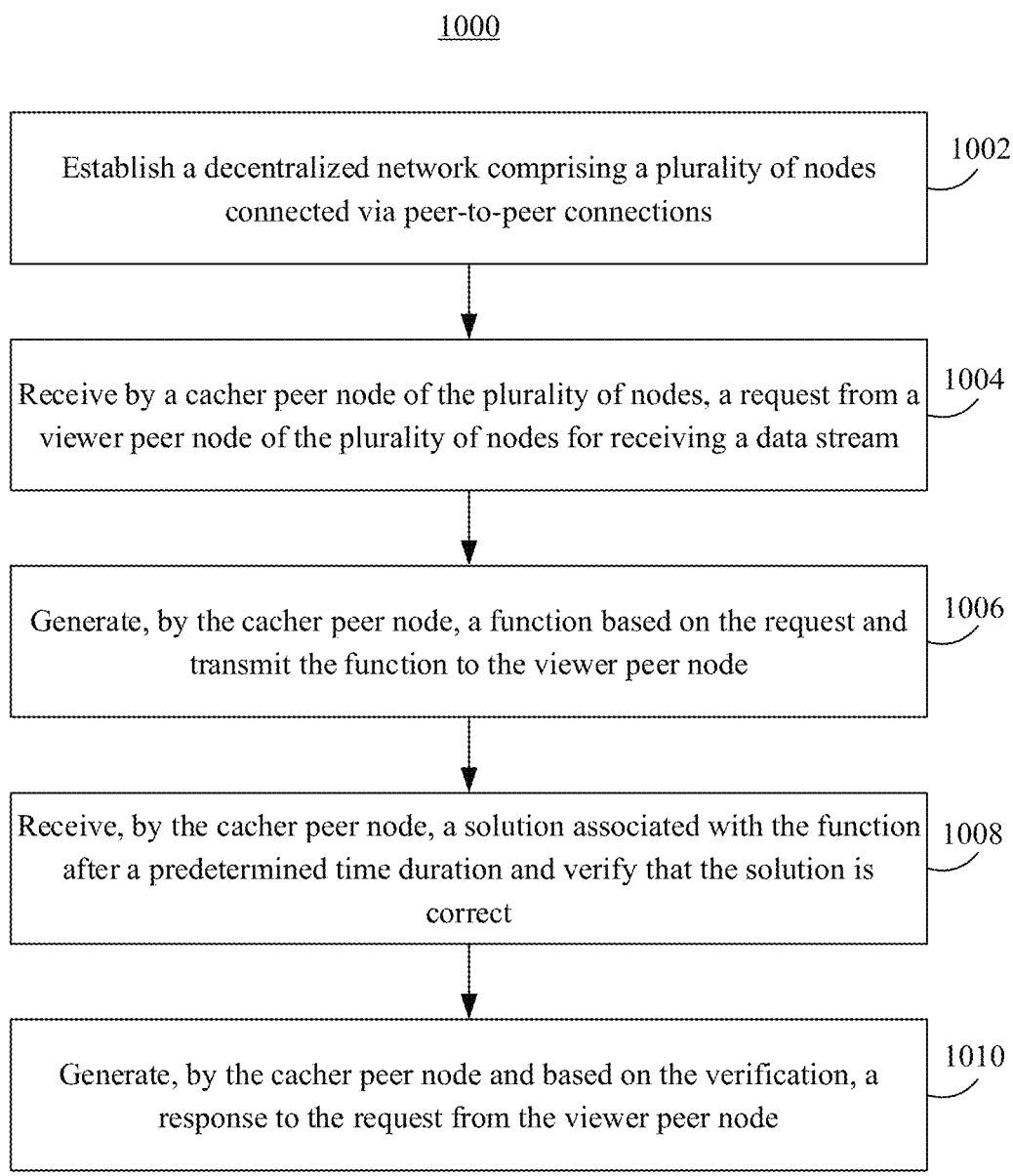
FIG. 10 is an illustration of a third exemplary flowchart showing additional example operations of the disclosed systems, in accordance with example embodiments of the disclosure.

FIG. 10 shows an example flowchart 1000 for use in connection with a decentralized data streaming network in which a computer-implemented method serves to reduce malicious attacks on the decentralized data streaming network. The decentralized data streaming network may comprise cacher and viewer peer nodes. In particular, at block 1002, the decentralized data streaming network may be established comprising a plurality of nodes connected via peer-to-peer connections. At block 1004, a cacher peer node of the plurality of nodes may receive a request for a data stream from a viewer peer node of the plurality of nodes. The cacher peer node may determine that the viewer peer node is suspicious (or potentially malicious) based on the request. At block 1006, the cacher peer node may generate a function (e.g., VDF challenge) based on the request, and transmit the function to the viewer peer node. At block 1008, the cacher peer node may receive a solution associated with the function after a predetermined time duration and verify that the solution is correct. At block 1010, the cacher peer node can transmit, based on the verification, the data stream to the viewer peer node.

In some embodiments comprising decentralized data streaming with digital rights management (DRM), the cacher peer node may generate, based on the verification, an encrypted data stream based on the data stream and a data key to decrypt the data stream. Further, the cacher peer node may transmit the encrypted data stream and the data key to decrypt the data stream to the viewer peer node.

In some embodiments, the system may use NFTs as an authentication method to support Digital Right Management (DRM), and a VDF-based rate limiting mechanism can be employed in this context to further enhance the robustness of the system.

In some embodiments for streaming applications with DRM, a source edge cacher node can produce a data stream and can generate a corresponding seed; further, the disclosed systems can derive a symmetric data encryption key from the seed. In some embodiments, when a source edge cacher node communicates with a decentralized peer viewer node, the source edge cacher can transmit the symmetric key to the peer viewer node. When the peer viewer node becomes eligible as a result of having a corresponding NFT, the peer viewer node can receive the encrypted data from the source edge cacher node through an encrypted channel. In various embodiments, while the data key is described in some embodiments herein as being symmetric, alternative aspects contemplate using an asymmetric key. (As noted above, the disclosed systems can use at least two different keys, a transaction key which can be used for blockchain transactions and another data key, which can be used for encrypting and decrypting a data stream between nodes.)

In one embodiment, the verifiable delay function (VDF) is selected from the group consisting of iterative squaring in RSA groups, addition of points in elliptic curves, modular exponentiations, and iteratively computing τ squarings in a Rivest-Shamir-Adleman (RSA) group.

In another embodiment, the predetermined time duration may include a duration to solve the function, and the duration to solve the function is not reduced below a predetermined threshold by parallelizing operations to solve the function.

In another embodiment, the computer-implemented method further includes, determining, by the cacher peer node, a parameter associated with the viewer peer node; and determining, by the cacher peer node and based on the parameter, a type of the function. In some embodiments, the parameter comprises a difficulty of solving the function. In other embodiments, the determination of the parameter is based on a computational capability of the viewer peer node.

In one embodiment, the generation of the function is based on receiving, by the cacher peer node from the viewer peer node, a number of requests for receiving the data stream, the number of requests exceeding a predetermined threshold in a second predetermined time duration. In another embodiment, the cacher peer node tags the viewer peer node as a malicious node based on the number of requests exceeding the predetermined threshold in the second predetermined time duration.

ALTERNATIVE EMBODIMENTS

In various embodiments, the disclosed systems can distribute work (e.g., VDF solving) across different nodes of the network to prevent DoS attack and/or prevent other nefarious activity initiated on the network, such as providing spam prevention. In some embodiments, the disclosed systems can provide the VDF in a manner that can be thought of as being similar to solving a CAPTCHA on the blockchain. However, while some systems may work with CAPTCHAs, as AI and machine vision techniques improve, the CAPCHA may be defeatable. Accordingly, the VDFs can be used to provide a similar functionality to reduce and/or prevent the likelihood and/or frequency of defeating the VDF using classical computers (e.g., non-quantum-based computers).

In various embodiments, the disclosed systems can be used as a means to provide blockchain-based spam prevention and/or DoS-attack prevention using a cryptographic proof. As noted, with VDFs the disclosed systems can verify that computations associated with a given node took a predetermined amount of time or took a predetermined number of CPU cycles. Other techniques, such as PoW, can include computing a hash puzzle that takes a predetermined amount of time but is highly parallelizable. Accordingly, various nodes (e.g., malicious viewer peer nodes) can compute solutions in parallel. However, by using the disclosed VDF solution, the nodes (e.g., malicious viewer peer nodes) are not able to perform the solutions in parallel, and hence cannot defeat the security features of the present invention.

In some embodiments, the disclosed systems can be used as a means to provide protections to blockchain network nodes that participate in blockchain governance.

In some embodiments, the THETA blockchain network employs a multi-level Byzantine Fault Tolerant (BFT) consensus mechanism to allow thousands of nodes to participate in a consensus process while still supporting very high transaction throughput, for example, in the range of 1,000+ transactions per second. Data streaming applications typically require fast consensus. For bandwidth sharing rewards, users who contribute redundant bandwidth typically want the payment to be confirmed before sending the next data segment. To minimize transaction confirmation delays, the THETA protocol may use a small set of nodes to form a validator committee, producing a chain of blocks as fast as possible using a practical BFT (PBFT)-like process. With a sufficient number of validators, such as 10 to 20 nodes, the validator committee may produce blocks at a fast speed, while still retaining a high degree of difficulty to prevent an adversary from compromising the integrity of the blockchain. A transaction is "committed" once it is included in a new block. To be eligible to join the validator committee, a node may lock up a certain amount of stake for a period of time. The locked stake could be slashed if malicious behavior is detected. The blocks that the committee reaches consensus on are called settled blocks, and the process by which they produce a chain of blocks is called the block settlement process.

Guardian nodes, which function as "consensus participants", may validate and finalize the chain generated by a validator committee at checkpoint blocks. The guardian network is a super set of the validator committee, where a validator is also a guardian. With a certain amount of token lockup for a period of time, any node in the network may instantly become a guardian. The guardians may download and examine the chain of blocks generated by the validator committee and try to reach consensus on the checkpoints. "Finalization" refers to convincing each honest guardian that more than a certain portion (e.g., ⅔) of all the other guardians see the same chain of blocks. Blocks that the guardian nodes have reached consensus on are called finalized blocks, and the process by which they finalize the chain of blocks is called the block finalization process. Checkpoint blocks are a selected subset of blocks that satisfy a given set of conditions, for example, whose height is a multiple of some integer. This "leapfrogging" finalization strategy leverages the immutability characteristic of the blockchain data structure, where as long as two guardian nodes agree on the hash of a block, with overwhelming probability, they will have exactly the same copy of the entire blockchain up to that block. The validator/guardian division provides multiple levels of security guarantee. The validator committee provides a first level of consensus and the guardian pool forms a second line of defense. With thousands of nodes, it is substantially more difficult to compromise the integrity of the network, and this provides a much higher level of security. This consensus mechanism achieves a good balance among transaction throughput, consistency, and level of decentralization.

In one embodiment, FIGS. 3-5 shows the DRM using NFT setup, while FIGS. 6-7 shows a separate VDF-based DoS attack avoidance scenario on the same network. If an NFT is already used for authentication, FIG. 7 shows that the malicious viewer peer node 706 has paid for the service but chooses to do a DoS attack anyway. In another embodiment, not shown in FIG. 7, there are no encryption keys sent to the malicious viewer peer node 706.

In one embodiment, the scenario discussed above in reference to FIG. 7 is between one cacher node and one malicious viewer node, so the setup is analogous to a typical DoS attack on a video server. In another embodiment, the solution described herein is used between peer nodes to prevent DoS attacks on honest peer nodes within the decentralized P2P streaming system.

In one embodiment, in order to check if a viewer peer node is eligible to watch a stream, a relay node may need to query one or more of the other blockchain nodes on the network to verify the NFT ownership. If the blockchain nodes are under attack (e.g., a distributed denial-of-service (DDoS attack), a spamming attack, or a similar attack), the blockchain nodes may not be able to respond to the NFT ownership queries in time. As a result, a given relay node might refuse to send the video stream to the viewer peer node since the relay node was not able to verify that the viewer is eligible to watch the stream. To counter such attacks, the blockchain nodes can incorporate the VDF-based rate limiting mechanism to deter the DDoS attackers.

In one embodiment, the stream source node can be configured to transmit an encrypted stream and one or more data keys to one or more cachers and viewers. If the source node is under a DDoS attack, then the entire stream might become unavailable. Accordingly, the disclosed systems can employ a VDF-based rate limiting protection mechanism similar to that described herein to shield the source node from the attackers.

Exemplary System Architecture

Figure 11:
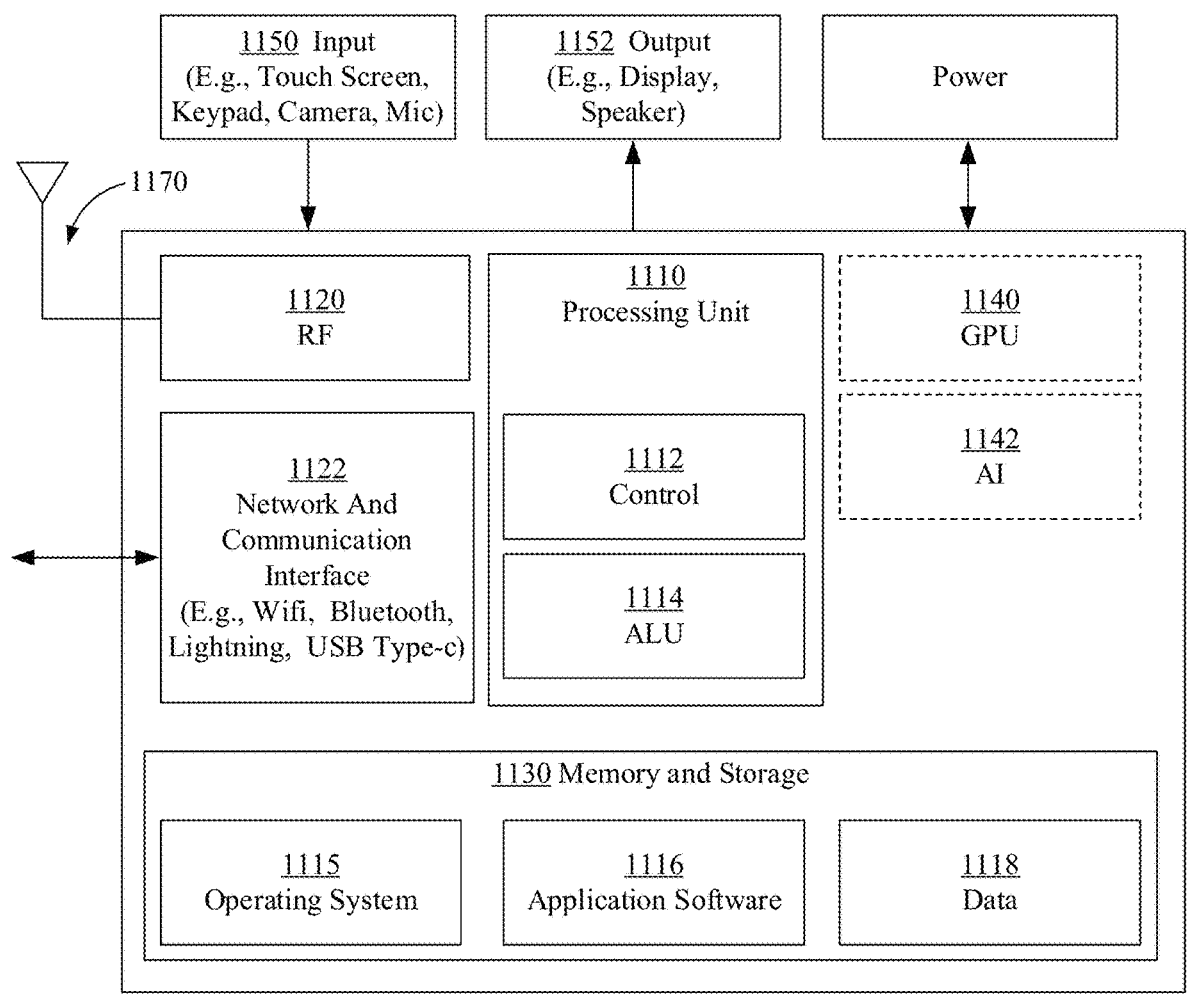
FIG. 11 is an exemplary schematic diagram of a user computing entity for implementing an edge node, in accordance with example embodiments of the disclosure.
Figure 12:
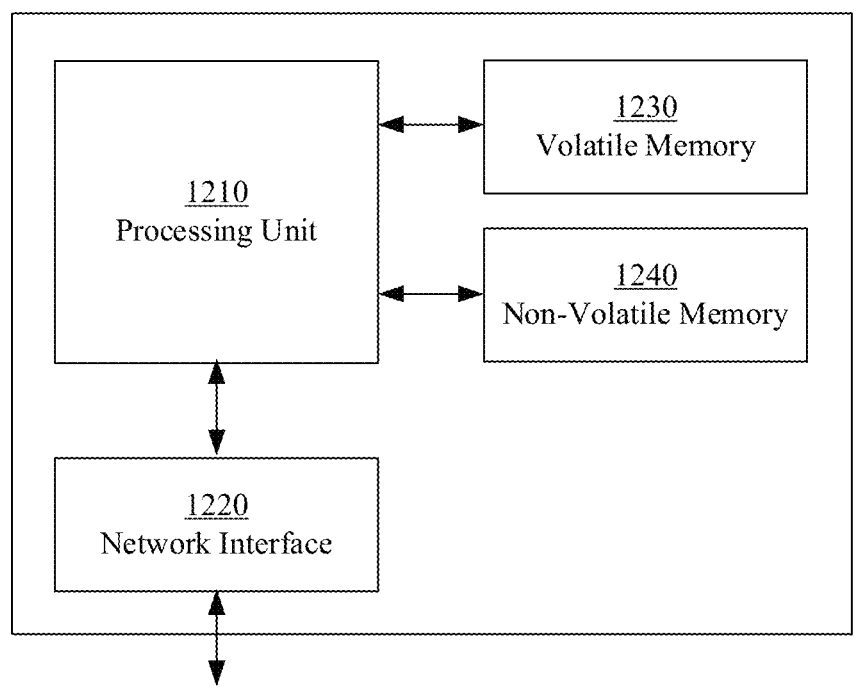
FIG. 12 is an exemplary schematic diagram of a management computing entity for implementing a server, in accordance with example embodiments of the disclosure.

An exemplary embodiment of the present disclosure may include one or more end user computing entities 1100, one or more networks, and one or more CDN, tracker server, payment server, or other management computing entities 1200, as shown in FIGS. 11 and 12. Each of these components, entities, devices, systems, and similar words used herein interchangeably may be in direct or indirect communication with, for example, one another over the same or different wired or wireless networks. Additionally, while FIGS. 11 and 12 illustrate the various system entities as separate, standalone entities, the various embodiments are not limited to this particular architecture.

Exemplary User Computing Entity

FIG. 11 is an exemplary schematic diagram of an end user computing device for implementing an edge node, according to exemplary embodiments of the present invention. For example, an end user computing device 1100 capable of viewing or caching streamed video may include one or more components as shown. As will be recognized, these architectures and descriptions are provided for exemplary purposes only and are not limiting to the various embodiments.

In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, retrieving, operating on, processing, displaying, storing, determining, creating, generating, monitoring, evaluating, comparing, and/or similar terms used herein interchangeably. In various embodiments, these functions, operations, and/or processes can be performed on data, content, information, and/or similar terms used herein interchangeably. On the other hand, a content server, tracker, or payment server may be implemented according to the exemplary schematic diagram shown in FIG. 12, possibly in the cloud, and possibly with logically or physically distributed architectures.

As shown in FIG. 11, user computing entity 1100 may include an antenna 1170, a radio transceiver 1120, and a processing unit 1110 that provides signals to and receives signals from the transceiver. The signals provided to and received from the transceiver may include signaling information in accordance with air interface standards of applicable wireless systems. In this regard, user computing entity 1100 may be capable of operating with one or more air interface standards, communication protocols, modulation types, and access types. More particularly, user computing entity 1100 may operate in accordance with any of a number of wireless communication standards and protocols. In some embodiments, user computing entity 1100 may operate in accordance with multiple wireless communication standards and protocols, such as 5G, UMTS, FDM, OFDM, TDM, TDMA, E-TDMA, GPRS, extended GPRS, CDMA, CDMA2000, 1×RTT, WCDMA, TD-SCDMA, GSM, LTE, LTE advanced, EDGE, E-UTRAN, EVDO, HSPA, HSDPA, MDM, DMT, Wi-Fi, Wi-Fi Direct, WiMAX, UWB, IR, NFC, ZigBee, Wibree, Bluetooth, and/or the like. Similarly, user computing entity 1100 may operate in accordance with multiple wired communication standards and protocols, via a network and communication interface 1122.

Via these communication standards and protocols, user computing entity 1100 can communicate with various other computing entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). User computing entity 1100 can also download changes, add-ons, and updates, for instance, to its firmware, software (e.g., including executable instructions, applications, program modules), and operating system.

In some implementations, processing unit 1110 may be embodied in several different ways. For example, processing unit 1110 may be embodied as one or more complex programmable logic devices (CPLDs), microprocessors, multi-core processors, coprocessing entities, application-specific instruction-set processors (ASIPs), microcontrollers, and/or controllers. Further, the processing unit may be embodied as one or more other processing devices or circuitry. The term circuitry may refer to an entirely hardware embodiment or a combination of hardware and computer program products. Thus, processing unit 1110 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 1110 may be configured for a particular use or configured to execute instructions stored in volatile or non-volatile media or otherwise accessible to the processing unit. As such, whether configured by hardware or computer program products, or by a combination thereof, processing unit 1110 may be capable of performing steps or operations according to embodiments of the present invention when configured accordingly.

In some embodiments, processing unit 1110 may comprise a control unit 1112 and a dedicated arithmetic logic unit 1114 (ALU) to perform arithmetic and logic operations. In some embodiments, user computing entity 1100 may optionally comprise a graphics processing unit 1140 (GPU) for specialized image and video rendering tasks, and/or an artificial intelligence (AI) accelerator 1142, specialized for applications including artificial neural networks, machine vision, and machine learning. In some embodiments, processing unit 1110 may be coupled with GPU 1140 and/or AI accelerator 1142 to distribute and coordinate processing tasks.

In some embodiments, user computing entity 1100 may include a user interface, comprising an input interface 1150 and an output interface 1152, each coupled to processing unit 1110. User input interface 1150 may comprise any of a number of devices or interfaces allowing the user computing entity 1100 to receive data, such as a keypad (hard or soft), a touch display, a mic for voice/speech, and a camera for motion or posture interfaces. User output interface 1152 may comprise any of a number of devices or interfaces allowing user computing entity 1100 to provide content and information to a user, such as through a touch display, or a speaker for audio outputs. In some embodiments, output interface 1152 may connect user computing entity 1100 to an external loudspeaker or projector, for audio or visual output.

User computing entity 1100 may also include volatile and/or non-volatile storage or memory 1130, which can be embedded and/or may be removable. A non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory may store an operating system 1115, application software 1116, data 1118, databases, database instances, database management systems, programs, program modules, SDKs, scripts, source code, object code, byte code, compiled code, interpreted code, machine code, executable instructions, and/or the like to implement the functions of user computing entity 1100. As indicated, this may include a user application that is resident on the entity or accessible through a browser or other user interface for communicating with a management computing entity and/or various other computing entities.

In some embodiments, user computing entity 1100 may include location determining aspects, devices, modules, functionalities, and/or similar words used herein interchangeably. For example, user computing entity 1100 may include outdoor positioning aspects, such as a location module adapted to acquire, for example, latitude, longitude, altitude, geocode, course, direction, heading, speed, universal time (UTC), date, and/or various other information/data.

In one embodiment, the location module may acquire data, sometimes known as ephemeris data, by identifying the number of satellites in view and the relative positions of those satellites. Alternatively, the location information may be determined by triangulating the user computing entity's position in connection with a variety of other systems, including cellular towers, Wi-Fi access points, and/or the like. Similarly, user computing entity 1100 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters. Location information thus obtained may be used in determining nearby peers for data distribution and retrieval.

In some embodiments, two or more users may establish a connection between their computing devices using any of the networking protocols listed previously, and any peer-to-peer protocols including BitTorrent, or that provided by the THETA edge network. In some embodiments, the user computing devices may use a network interface such as 1122 to communicate with various other computing entities, to exchange data content, information, and/or similar terms used herein interchangeably that can be transmitted, received, operated on, processed, displayed, stored, and/or the like.

In some embodiments, data (e.g., audio, video, etc.) may be downloaded by one or more user computing devices to a server such as shown in FIG. 12 when the device accesses a network connection, such as a wireless access point or hotspot. The data transfer may be performed using protocols like file transfer protocol (FTP), MQ telemetry transport (MQTT), advanced message queuing protocol (AMQP), hypertext transfer protocol (HTTP), and HTTP secure (HTTPS). These protocols may be made secure over transport layer security (TLS) and/or secure sockets layer (SSL).

Exemplary Management Computing Entity

FIG. 12 is an exemplary schematic diagram of a management computing entity 1200, such as a CDN server, a tracker server, or a computation task initiator, for implementing the THETA network, according to exemplary embodiments of the present invention. The terms computing entity, computer, entity, device, system, and/or similar words used herein interchangeably are explained in detailed with reference to user computing entity 1100.

As indicated, in one embodiment, management computing entity 1200 may include one or more network or communications interface 1220 for communicating with various computing entities, such as by communicating data, content, information, and/or similar terms used herein interchangeably that can be transmitted, received, operated on, processed, displayed, stored, and/or the like. For instance, management computing entity 1200 may communicate with user computing device 1100 and/or a variety of other computing entities. Network or communications interface 1220 may utilize a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 1200 may be configured to communicate via wireless external communication networks using any of a variety of standards and protocols as discussed with reference to user computing device 1100.

As shown in FIG. 12, in one embodiment, management computing entity 1200 may include or be in communication with one or more processing unit 1210 (also referred to as processors, processing circuitry, processing element, and/or similar terms used herein interchangeably) that communicate with other elements within the management computing entity 1200. As will be understood, processing unit 1210 may be embodied in a number of different ways. For example, as one or more CPLDs, microprocessors, multi-core processors, coprocessing entities, ASIPs, microcontrollers, and/or controllers, in the form of integrated circuits, application specific integrated circuits (ASICs), field programmable gate arrays (FPGAs), programmable logic arrays (PLAs), hardware accelerators, other circuitry, and/or the like. As will therefore be understood, processing unit 1210 may be configured for a particular use or configured to execute instructions stored in volatile or non-volatile media 1230 and 1240. As such, whether configured by hardware or computer program products, or by a combination thereof, processing unit 1210 may be capable of performing steps or operations according to embodiments of the present disclosure when configured accordingly.

Although not shown explicitly, management computing entity 1200 may include or be in communication with one or more input elements, such as a keyboard, a mouse, a touch screen/display, a camera for motion and movement input, a mic for audio input, a joystick, and/or the like. Management computing entity 1200 may also include or be in communication with one or more output elements such as speaker, screen/display, and/or the like.

In various embodiments, one or more of the components of management computing entity 1200 may be located remotely from other management computing entity components, such as in a distributed system or in the cloud. Furthermore, one or more of the components may be combined and additional components performing functions described herein may be included in the management computing entity 1200.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every end-user device is accommodated by the server to practice the methods of the present invention.

The present invention may be implemented in hardware and/or in software. Many components of the system, for example, signal processing modules or network interfaces etc., have not been shown, so as not to obscure the present invention. However, one of ordinary skill in the art would appreciate that the system necessarily includes these components. A computing device is a hardware that includes at least one processor coupled to a memory. The processor may represent one or more processors (e.g., microprocessors), and the memory may represent random access memory (RAM) devices comprising a main storage of the hardware, as well as any supplemental levels of memory, e.g., cache memories, non-volatile or back-up memories (e.g., programmable or flash memories), read-only memories, etc. In addition, the memory may be considered to include memory storage physically located elsewhere in the hardware, e.g. any cache memory in the processor, as well as any storage capacity used as a virtual memory, e.g., as stored on a mass storage device.

The hardware of a computing device also typically receives a number of inputs and outputs for communicating information externally. For interface with a user, the hardware may include one or more user input devices (e.g., a keyboard, a mouse, a scanner, a microphone, a camera, etc.) and a display (e.g., a Liquid Crystal Display (LCD) panel). For additional storage, the hardware may also include one or more mass storage devices, e.g., a floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware may include an interface to one or more networks (e.g., a local area network (LAN), a wide area network (WAN), a wireless network, and/or the Internet among others) to permit the communication of streaming content and information with other computers coupled to the networks. It should be appreciated that the hardware typically includes suitable analog and/or digital interfaces to communicate with each other.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

The hardware operates under the control of an operating system, and executes various computer software applications, components, program code, libraries, objects, modules, etc. to perform the methods, processes, and techniques described above.

In general, the method executed to implement the embodiments of the invention may be implemented as part of an operating system or a specific application, component, program, object, module or sequence of instructions referred to as "computer program(s)" or "program code(s)." The computer programs typically comprise one or more instructions set at various times in various memory and storage devices in a computing device or computer, and that, when read and executed by one or more processors in the computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMS), Digital Versatile Disks, (DVDs), etc.), and digital and analog communication media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

A software component may be stored as a file or other data storage construct. Software components of a similar type or functionally related may be stored together such as, for example, in a particular directory, folder, or library. Software components may be static (for example, pre-established or fixed) or dynamic (for example, created or modified at the time of execution).

Software components may invoke or be invoked by other software components through any of a wide variety of mechanisms. Invoked or invoking software components may comprise other custom-developed application software, operating system functionality (for example, device drivers, data storage (for example, file management) routines, other common routines and services, etc.), or third-party software components (for example, middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. A computer-implemented method utilized by a cacher device in a decentralized data streaming network, comprising:
receiving, by the cacher device, a request for a data stream from a viewer device in the decentralized data streaming network, wherein the decentralized data streaming network comprises a plurality of peer devices, the cacher device for caching the data stream, and the viewer device for consuming the data stream;
determining that the viewer device is suspicious based on the request;

generating a verifiable delay function (VDF) based on the determination, to reduce malicious attacks on the cacher device;
transmitting the VDF to the viewer device;
receiving a solution associated with the VDF after a predetermined time duration;
verifying that the solution is correct; and
generating, based on the verification, a response to the request.

2. The computer-implemented method of claim 1, further comprising:
generating, by the cacher device, an encrypted data stream based on the data stream and a data key to decrypt the encrypted data stream; and
transmitting, by the cacher device, the encrypted data stream and the data key to decrypt the encrypted data stream to the viewer device.

3. The computer-implemented method of claim 1, wherein the verifiable delay function (VDF) comprises at least one of iterative squaring in RSA groups, addition of points in elliptic curves, modular exponentiations, and iteratively computing $\tau$ squarings in a Rivest-Shamir-Adleman (RSA) group.

4. The computer-implemented method of claim 1, wherein the request for the data stream comprises a malicious request associated with a denial-of-service (DoS) attack or a spamming attack.

5. The computer-implemented method of claim 1, wherein the predetermined time duration comprises a duration to solve the verifiable delay function (VDF), and wherein the duration to solve the VDF is not reduced below a predetermined threshold by parallelizing operations to solve the VDF.

6. The computer-implemented method of claim 1, wherein the computer-implemented method further comprises:
determining a parameter associated with the viewer device; and
determining, based on the parameter, a type of the verifiable delay function (VDF).

7. The computer-implemented method of claim 6, wherein the parameter comprises a difficulty of solving the verifiable delay function (VDF).

8. The computer-implemented method of claim 6, wherein the determination of the parameter is based on a computational capability of the viewer device.

9. The computer-implemented method of claim 1, wherein the generation of the verifiable delay function (VDF) is based on receiving, from the viewer device over a second predetermined time duration, a number of requests for receiving the data stream, wherein the number of requests exceeds a predetermined threshold.

10. The computer-implemented method of claim 9, wherein the cacher device tags the viewer device as malicious based on the number of requests received from the viewer device over the second predetermined time duration exceeding the predetermined threshold.

11. A non-transitory storage medium storing executable program code, the program code utilized by a cacher device in a decentralized data streaming network, the program code configured to:
receive, by the cacher device, a request for a data stream from a viewer device in the decentralized data streaming network, wherein the decentralized data streaming network comprises a plurality of peer devices, the cacher device for caching the data stream, and the viewer device for consuming the data stream;
determine that the viewer device is suspicious based on the request;
generate a verifiable delay function (VDF) based on the determination, to reduce malicious attacks on the cacher device;
transmit the VDF to the viewer device;
receive a solution associated with the VDF after a predetermined time duration;
verify that the solution is correct; and
generate, based on the verification, a response to the request.

12. The non-transitory storage medium of claim 11, wherein the verifiable delay function (VDF) comprises at least one of iterative squaring in RSA groups, addition of points in elliptic curves, modular exponentiations, and iteratively computing $\tau$ squarings in a Rivest-Shamir-Adleman (RSA) group.

13. The non-transitory storage medium of claim 11, wherein the request for the data stream comprises a malicious request associated with a denial-of-service (DoS) attack or a spamming attack.

14. The non-transitory storage medium of claim 11, wherein the predetermined time duration comprises a duration to solve the verifiable delay function (VDF), and wherein the duration to solve the VDF is not reduced below a predetermined threshold by parallelizing operations to solve the VDF.

15. The non-transitory storage medium of claim 11, wherein the program code is further configured to:
determine a parameter associated with the viewer device; and
determine, based on the parameter, a type of the verifiable delay function (VDF).

16. The non-transitory storage medium of claim 15, wherein the parameter comprises a difficulty of solving the verifiable delay function (VDF).

17. A cacher device in a decentralized data streaming network, comprising:
at least one processor;
a non-transitory storage medium storing executable program code, the program code accessible by the processor, the program code when executed by the processor causes the processor to:
receive, by the cacher device, a request for a data stream from a viewer device in the decentralized data streaming network, wherein the decentralized data streaming network comprises a plurality of peer devices, the cacher device for caching the data stream, and the viewer device for consuming the data stream;
determine that the viewer device is suspicious based on the request;
generate a verifiable delay function (VDF) based on the determination, to reduce malicious attacks on the cacher device;
transmit the VDF to the viewer device;
receive a solution associated with the VDF after a predetermined time duration;
verify that the solution is correct; and
generate, based on the verification, a response to the request.

18. The cacher device of claim 17, wherein the verifiable delay function (VDF) comprises at least one of iterative squaring in RSA groups, addition of points in elliptic curves, modular exponentiations, and iteratively computing $\tau$ squarings in a Rivest-Shamir-Adleman (RSA) group.

19. The cacher device of claim 17, wherein the request for the data stream comprises a malicious request associated with a denial-of-service (DoS) attack or a spamming attack.

20. The cacher device of claim 17, wherein the predetermined time duration comprises a duration to solve the verifiable delay function (VDF), and wherein the duration to solve the VDF is not reduced below a predetermined threshold by parallelizing operations to solve the VDF.

* * * * *